(12) United States Patent
Forstall et al.

(10) Patent No.: US 8,311,526 B2
(45) Date of Patent: Nov. 13, 2012

(54) LOCATION-BASED CATEGORICAL INFORMATION SERVICES

(75) Inventors: Scott Forstall, Mountain View, CA (US); Gregory N. Christie, San Jose, CA (US); Robert E. Borchers, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 815 days.

(21) Appl. No.: 12/127,505

(22) Filed: May 27, 2008

(65) Prior Publication Data

US 2009/0005021 A1    Jan. 1, 2009

Related U.S. Application Data

(60) Provisional application No. 60/946,825, filed on Jun. 28, 2007.

(51) Int. Cl.
G06F 15/16    (2006.01)

(52) U.S. Cl. .................... 455/414.3; 455/456.3

(58) Field of Classification Search ............... 455/414.3, 455/418, 419, 456.1, 456.3, 457
See application file for complete search history.

(56) References Cited

U.S. PATENT DOCUMENTS

| | | |
|---|---|---|
| 4,644,351 A | 2/1987 | Zabarsky et al. |
| 4,903,212 A | 2/1990 | Yokouchi et al. |
| 4,907,159 A | 3/1990 | Mauge et al. |
| 4,999,783 A | 3/1991 | Tenmoku et al. |
| 5,031,104 A | 7/1991 | Ikeda et al. |
| 5,046,011 A | 9/1991 | Kakihara et al. |
| 5,067,081 A | 11/1991 | Person |
| 5,126,941 A | 6/1992 | Gurmu et al. |
| 5,164,904 A | 11/1992 | Sumner |
| 5,170,165 A | 12/1992 | Iihoshi et al. |
| 5,173,691 A | 12/1992 | Sumner |
| 5,182,555 A | 1/1993 | Sumner |
| 5,187,810 A | 2/1993 | Yoneyama et al. |
| 5,195,031 A | 3/1993 | Ordish |
| 5,208,763 A | 5/1993 | Hong et al. |
| 5,218,629 A | 6/1993 | Dumond, Jr. et al. |
| 5,243,652 A | 9/1993 | Teare |
| 5,274,560 A | 12/1993 | LaRue |
| 5,289,572 A | 2/1994 | Yano et al. |
| 5,295,064 A | 3/1994 | Malec et al. |
| 5,307,278 A | 4/1994 | Hermans et al. |
| 5,317,311 A | 5/1994 | Martell et al. |

(Continued)

FOREIGN PATENT DOCUMENTS

BR    9904979    12/2000

(Continued)

OTHER PUBLICATIONS

Feddema et al., "Cooperative Sentry Vehicles and Differential GPS Leapfrog," 2000, *United States Department of Energy*, pp. 1-12.

(Continued)

*Primary Examiner* — Sam Bhattacharya
(74) *Attorney, Agent, or Firm* — Blakely, Sokoloff, Taylor & Zafman LLP

(57) ABSTRACT

A selection of a category of interest and location information is used to determine categorical information that is provided to a device. In some implementations, the device includes a touch-sensitive display and presents the categorical information on a map using an indicator. In some implementations, the categorical information can be shared and/or updated by others.

34 Claims, 10 Drawing Sheets

U.S. PATENT DOCUMENTS

| | | |
|---|---|---|
| 5,337,044 A | 8/1994 | Folger et al. |
| 5,339,391 A | 8/1994 | Wroblewski et al. |
| 5,371,678 A | 12/1994 | Nomura |
| 5,374,933 A | 12/1994 | Kao |
| 5,379,057 A | 1/1995 | Clough et al. |
| 5,390,125 A | 2/1995 | Sennott et al. |
| 5,406,490 A | 4/1995 | Braegas |
| 5,416,712 A | 5/1995 | Geier et al. |
| 5,416,890 A | 5/1995 | Beretta |
| 5,463,725 A | 10/1995 | Henckel |
| 5,469,362 A | 11/1995 | Hunt et al. |
| 5,479,600 A | 12/1995 | Wroblewski et al. |
| 5,504,482 A | 4/1996 | Schreder |
| 5,508,707 A | 4/1996 | LeBlanc et al. |
| 5,510,801 A | 4/1996 | Engelbrecht et al. |
| 5,519,760 A | 5/1996 | Borkowski et al. |
| 5,523,950 A | 6/1996 | Peterson |
| 5,537,460 A | 7/1996 | Holliday, Jr. et al. |
| 5,539,395 A | 7/1996 | Buss |
| 5,539,647 A | 7/1996 | Shibata et al. |
| 5,552,989 A | 9/1996 | Bertrand |
| 5,559,520 A | 9/1996 | Barzegar et al. |
| 5,570,412 A | 10/1996 | LeBlanc |
| 5,598,572 A | 1/1997 | Tanikoshi et al. |
| 5,627,547 A | 5/1997 | Ramaswamy et al. |
| 5,627,549 A | 5/1997 | Park |
| 5,628,050 A | 5/1997 | McGraw |
| 5,630,206 A | 5/1997 | Urban et al. |
| 5,636,245 A | 6/1997 | Ernst |
| 5,642,303 A | 6/1997 | Small |
| 5,646,853 A | 7/1997 | Takahashi et al. |
| 5,654,908 A | 8/1997 | Yokoyama |
| 5,663,732 A | 9/1997 | Stangeland et al. |
| 5,675,362 A | 10/1997 | Clough et al. |
| 5,675,573 A | 10/1997 | Karol et al. |
| 5,677,837 A | 10/1997 | Reynolds |
| 5,684,859 A | 11/1997 | Chanroo et al. |
| 5,689,252 A | 11/1997 | Ayanoglu et al. |
| 5,689,270 A | 11/1997 | Kelley et al. |
| 5,689,431 A | 11/1997 | Rudow et al. |
| 5,708,478 A | 1/1998 | Tognazzini |
| 5,717,392 A | 2/1998 | Eldridge |
| 5,732,074 A | 3/1998 | Spaur et al. |
| 5,742,666 A | 4/1998 | Alpert |
| 5,745,865 A | 4/1998 | Rostoker et al. |
| 5,748,109 A | 5/1998 | Kosaka et al. |
| 5,752,186 A | 5/1998 | Malackowski et al. |
| 5,754,430 A | 5/1998 | Sawada |
| 5,758,049 A | 5/1998 | Johnson et al. |
| 5,760,773 A | 6/1998 | Berman et al. |
| 5,767,795 A | 6/1998 | Schaphorst |
| 5,774,824 A | 6/1998 | Streit et al. |
| 5,774,829 A | 6/1998 | Cisneros et al. |
| 5,793,630 A | 8/1998 | Theimer |
| 5,796,365 A | 8/1998 | Lewis |
| 5,796,613 A | 8/1998 | Kato et al. |
| 5,806,018 A | 9/1998 | Smith et al. |
| 5,825,306 A | 10/1998 | Hiyokawa et al. |
| 5,825,884 A | 10/1998 | Zdepski et al. |
| 5,831,552 A | 11/1998 | Sogawa et al. |
| 5,835,061 A | 11/1998 | Stewart |
| 5,839,086 A | 11/1998 | Hirano |
| 5,845,227 A | 12/1998 | Peterson |
| 5,848,373 A | 12/1998 | DeLorme et al. |
| 5,862,244 A | 1/1999 | Kleiner et al. |
| 5,867,110 A | 2/1999 | Naito et al. |
| 5,870,686 A | 2/1999 | Monson |
| 5,872,526 A | 2/1999 | Tognazzini |
| 5,873,068 A | 2/1999 | Beaumont et al. |
| 5,883,580 A | 3/1999 | Briancon |
| 5,887,269 A | 3/1999 | Brunts et al. |
| 5,892,454 A | 4/1999 | Schipper et al. |
| 5,893,898 A | 4/1999 | Tanimoto |
| 5,898,680 A | 4/1999 | Johnstone |
| 5,899,954 A | 5/1999 | Sato |
| 5,905,451 A | 5/1999 | Sakashita |
| 5,908,465 A | 6/1999 | Ito et al. |
| 5,910,799 A | 6/1999 | Carpenter |
| 5,923,861 A | 7/1999 | Bertram et al. |
| 5,933,094 A | 8/1999 | Goss et al. |
| 5,933,100 A | 8/1999 | Golding |
| 5,936,572 A | 8/1999 | Loomis et al. |
| 5,938,721 A | 8/1999 | Dussell et al. |
| 5,941,930 A | 8/1999 | Morimoto et al. |
| 5,941,934 A | 8/1999 | Sato |
| 5,946,618 A | 8/1999 | Agre et al. |
| 5,948,040 A | 9/1999 | DeLorme et al. |
| 5,948,041 A | 9/1999 | Abo et al. |
| 5,948,061 A | 9/1999 | Merriman et al. |
| 5,955,973 A | 9/1999 | Anderson |
| 5,959,577 A | 9/1999 | Fan |
| 5,959,580 A | 9/1999 | Maloney et al. |
| 5,968,109 A | 10/1999 | Israni et al. |
| 5,969,678 A | 10/1999 | Stewart |
| 5,982,298 A | 11/1999 | Lappenbusch et al. |
| 5,982,324 A | 11/1999 | Watters et al. |
| 5,987,381 A | 11/1999 | Oshizawa |
| 5,991,692 A | 11/1999 | Spencer, II et al. |
| 5,999,126 A | 12/1999 | Ito |
| 6,002,932 A | 12/1999 | Kingdon et al. |
| 6,002,936 A | 12/1999 | Roel-Ng et al. |
| 6,005,928 A | 12/1999 | Johnson |
| 6,014,090 A | 1/2000 | Rosen et al. |
| 6,014,607 A | 1/2000 | Yagyu et al. |
| 6,023,653 A | 2/2000 | Ichimura et al. |
| 6,026,375 A | 2/2000 | Hall et al. |
| 6,028,550 A | 2/2000 | Froeberg et al. |
| 6,029,069 A | 2/2000 | Takaki |
| 6,031,490 A | 2/2000 | Forssen et al. |
| 6,041,280 A | 3/2000 | Kohli et al. |
| 6,052,645 A | 4/2000 | Harada |
| 6,058,350 A | 5/2000 | Ihara |
| 6,064,335 A | 5/2000 | Eschenbach |
| 6,067,502 A | 5/2000 | Hayashida et al. |
| 6,069,570 A | 5/2000 | Herring |
| 6,073,013 A | 6/2000 | Agre et al. |
| 6,073,062 A | 6/2000 | Hoshino et al. |
| 6,076,041 A | 6/2000 | Watanabe |
| 6,078,818 A | 6/2000 | Kingdon et al. |
| 6,081,206 A | 6/2000 | Kielland |
| 6,085,090 A | 7/2000 | Yee et al. |
| 6,085,148 A | 7/2000 | Jamison |
| 6,087,965 A | 7/2000 | Murphy |
| 6,088,594 A | 7/2000 | Kingdon et al. |
| 6,091,956 A | 7/2000 | Hollenberg |
| 6,091,957 A | 7/2000 | Larkins |
| 6,092,076 A | 7/2000 | McDonough et al. |
| 6,094,607 A | 7/2000 | Diesel |
| 6,101,443 A | 8/2000 | Kato |
| 6,104,931 A | 8/2000 | Havinis et al. |
| 6,108,555 A | 8/2000 | Maloney et al. |
| 6,111,541 A | 8/2000 | Karmel |
| 6,115,611 A | 9/2000 | Kimoto et al. |
| 6,115,754 A | 9/2000 | Landgren |
| 6,119,014 A | 9/2000 | Alperovich et al. |
| 6,122,520 A | 9/2000 | Want et al. |
| 6,125,279 A | 9/2000 | Hyziak et al. |
| 6,127,945 A | 10/2000 | Mura-Smith |
| 6,128,482 A | 10/2000 | Nixon et al. |
| 6,128,571 A | 10/2000 | Ito et al. |
| 6,134,548 A | 10/2000 | Gottsman et al. |
| 6,138,003 A | 10/2000 | Kingdon et al. |
| 6,138,142 A | 10/2000 | Linsk |
| 6,140,957 A | 10/2000 | Wilson et al. |
| 6,151,309 A | 11/2000 | Busuioc et al. |
| 6,151,498 A | 11/2000 | Roel-Ng et al. |
| 6,154,152 A | 11/2000 | Ito |
| 6,157,381 A | 12/2000 | Bates et al. |
| 6,157,841 A | 12/2000 | Bolduc et al. |
| 6,163,749 A | 12/2000 | McDonough et al. |
| 6,166,627 A | 12/2000 | Reeley |
| 6,167,266 A | 12/2000 | Havinis et al. |
| 6,169,552 B1 | 1/2001 | Endo et al. |
| 6,175,740 B1 | 1/2001 | Souissi et al. |
| 6,177,905 B1 | 1/2001 | Welch |
| 6,177,938 B1 | 1/2001 | Gould |
| 6,181,934 B1 | 1/2001 | Havinis et al. |

| Patent | Type | Date | Inventor |
|---|---|---|---|
| 6,185,427 | B1 | 2/2001 | Krasner et al. |
| 6,188,959 | B1 | 2/2001 | Schupfner |
| 6,195,557 | B1 | 2/2001 | Havinis et al. |
| 6,195,609 | B1 | 2/2001 | Pilley et al. |
| 6,199,014 | B1 | 3/2001 | Walker |
| 6,199,045 | B1 | 3/2001 | Giniger et al. |
| 6,199,099 | B1 | 3/2001 | Gershman et al. |
| 6,202,008 | B1 | 3/2001 | Beckert et al. |
| 6,202,023 | B1 | 3/2001 | Hancock et al. |
| 6,208,866 | B1 | 3/2001 | Rouhollahzadeh et al. |
| 6,212,473 | B1 | 4/2001 | Stefan et al. |
| 6,216,086 | B1 | 4/2001 | Seymour et al. |
| 6,222,483 | B1 | 4/2001 | Twitchell et al. |
| 6,233,518 | B1 | 5/2001 | Lee |
| 6,236,365 | B1 | 5/2001 | LeBlanc et al. |
| 6,236,933 | B1 | 5/2001 | Lang |
| 6,246,948 | B1 | 6/2001 | Thakker |
| 6,249,252 | B1 | 6/2001 | Dupray |
| 6,252,543 | B1 | 6/2001 | Camp |
| 6,252,544 | B1 | 6/2001 | Hoffberg |
| 6,256,498 | B1 | 7/2001 | Ludwig |
| 6,259,405 | B1 | 7/2001 | Stewart et al. |
| 6,266,612 | B1 | 7/2001 | Dussell et al. |
| 6,266,614 | B1 | 7/2001 | Alumbaugh |
| 6,266,615 | B1 | 7/2001 | Jin |
| 6,272,342 | B1 | 8/2001 | Havinis et al. |
| 6,278,884 | B1 | 8/2001 | Kim |
| 6,281,807 | B1 | 8/2001 | Kynast et al. |
| 6,282,491 | B1 | 8/2001 | Bochmann et al. |
| 6,282,496 | B1 | 8/2001 | Chowdhary |
| 6,295,454 | B1 | 9/2001 | Havinis et al. |
| 6,298,306 | B1 | 10/2001 | Suarez et al. |
| 6,304,758 | B1 | 10/2001 | Iierbig et al. |
| 6,313,761 | B1 | 11/2001 | Shinada |
| 6,314,369 | B1 | 11/2001 | Ito et al. |
| 6,314,406 | B1 | 11/2001 | O'Hagan et al. |
| 6,317,684 | B1 | 11/2001 | Roeseler et al. |
| 6,321,158 | B1 | 11/2001 | DeLorme et al. |
| 6,323,846 | B1 | 11/2001 | Westerman et al. |
| 6,324,692 | B1 | 11/2001 | Fiske |
| 6,326,918 | B1 | 12/2001 | Stewart |
| 6,332,127 | B1 | 12/2001 | Bandera et al. |
| 6,339,437 | B1 | 1/2002 | Nielsen |
| 6,339,746 | B1 | 1/2002 | Sugiyama et al. |
| 6,343,317 | B1 | 1/2002 | Glorikian |
| 6,345,288 | B1 | 2/2002 | Reed et al. |
| 6,351,235 | B1 | 2/2002 | Stilp |
| 6,353,398 | B1 | 3/2002 | Amin et al. |
| 6,353,743 | B1 | 3/2002 | Karmel |
| 6,353,837 | B1 | 3/2002 | Blumenau |
| 6,356,761 | B1 | 3/2002 | Huttunen |
| 6,356,763 | B1 | 3/2002 | Kangas et al. |
| 6,356,836 | B1 | 3/2002 | Adolph |
| 6,356,838 | B1 | 3/2002 | Paul |
| 6,370,629 | B1 | 4/2002 | Hastings et al. |
| 6,377,886 | B1 | 4/2002 | Gotou |
| 6,381,465 | B1 | 4/2002 | Chern et al. |
| 6,381,539 | B1 | 4/2002 | Shimazu |
| 6,381,603 | B1 | 4/2002 | Chan et al. |
| 6,385,458 | B1 | 5/2002 | Papadimitriou et al. |
| 6,385,465 | B1 | 5/2002 | Yoshioka |
| 6,385,535 | B2 | 5/2002 | Ohishi et al. |
| 6,389,288 | B1 | 5/2002 | Kuwahara et al. |
| 6,401,032 | B1 | 6/2002 | Jamison |
| 6,405,034 | B1 | 6/2002 | Tijerino |
| 6,405,123 | B1 | 6/2002 | Rennar et al. |
| 6,411,899 | B2 | 6/2002 | Dussell et al. |
| 6,414,635 | B1 | 7/2002 | Stewart et al. |
| 6,415,207 | B1 | 7/2002 | Jones |
| 6,415,220 | B1 | 7/2002 | Kovacs |
| 6,415,227 | B1 | 7/2002 | Lin |
| 6,427,115 | B1 | 7/2002 | Sekiyama |
| 6,430,411 | B1 | 8/2002 | Lempio et al. |
| 6,434,530 | B1 | 8/2002 | Sloane et al. |
| 6,438,490 | B2 | 8/2002 | Ohta |
| 6,449,485 | B1 | 9/2002 | Anzil |
| 6,452,498 | B2 | 9/2002 | Stewart |
| 6,456,234 | B1 | 9/2002 | Johnson |
| 6,456,956 | B1 | 9/2002 | Xiong |
| 6,459,782 | B1 | 10/2002 | Bedrosian et al. |
| 6,463,289 | B1 | 10/2002 | Havinis et al. |
| 6,477,581 | B1 | 11/2002 | Carpenter |
| 6,487,305 | B2 | 11/2002 | Kambe et al. |
| 6,490,454 | B1 | 12/2002 | Kangas et al. |
| 6,490,519 | B1 | 12/2002 | Lapidot et al. |
| 6,501,421 | B1 | 12/2002 | Dutta et al. |
| 6,505,046 | B1 | 1/2003 | Baker |
| 6,505,048 | B1 | 1/2003 | Moles et al. |
| 6,505,123 | B1 | 1/2003 | Root et al. |
| 6,507,802 | B1 | 1/2003 | Payton et al. |
| 6,516,197 | B2 | 2/2003 | Havinis et al. |
| 6,519,463 | B2 | 2/2003 | Tendler |
| 6,526,335 | B1 | 2/2003 | Treyz et al. |
| 6,529,143 | B2 | 3/2003 | Mikkola et al. |
| 6,535,140 | B1 | 3/2003 | Goss et al. |
| 6,542,812 | B1 | 4/2003 | Obradovich et al. |
| 6,542,819 | B1 | 4/2003 | Kovacs et al. |
| 6,546,360 | B1 | 4/2003 | Gilbert et al. |
| 6,552,682 | B1 | 4/2003 | Fan |
| 6,563,430 | B1 | 5/2003 | Kemink et al. |
| 6,564,143 | B1 | 5/2003 | Alewine et al. |
| 6,570,557 | B1 | 5/2003 | Westerman et al. |
| 6,571,279 | B1 | 5/2003 | Herz et al. |
| 6,574,484 | B1 | 6/2003 | Carley |
| 6,587,688 | B1 | 7/2003 | Chambers et al. |
| 6,587,782 | B1 | 7/2003 | Nocek et al. |
| 6,587,835 | B1 | 7/2003 | Treyz et al. |
| 6,594,480 | B1 | 7/2003 | Montalvo et al. |
| 6,597,305 | B2 | 7/2003 | Szeto et al. |
| 6,611,687 | B1 | 8/2003 | Clark et al. |
| 6,611,788 | B1 | 8/2003 | Hussa |
| 6,615,131 | B1 | 9/2003 | Rennard et al. |
| 6,615,213 | B1 | 9/2003 | Johnson |
| 6,647,257 | B2 | 11/2003 | Owensby |
| 6,650,902 | B1 | 11/2003 | Richton |
| 6,650,997 | B2 | 11/2003 | Funk |
| 6,662,016 | B1 | 12/2003 | Buckham et al. |
| 6,662,023 | B1 | 12/2003 | Helle |
| 6,667,963 | B1 | 12/2003 | Rantalainen et al. |
| 6,671,377 | B1 | 12/2003 | Havinis et al. |
| 6,674,849 | B1 | 1/2004 | Froeberg |
| 6,677,894 | B2 | 1/2004 | Sheynblat et al. |
| 6,678,516 | B2 | 1/2004 | Nordman et al. |
| 6,679,932 | B2 | 1/2004 | Birler et al. |
| 6,680,694 | B1 | 1/2004 | Knockeart et al. |
| 6,681,120 | B1 | 1/2004 | Kim |
| 6,683,538 | B1 | 1/2004 | Wilkes, Jr. |
| 6,697,018 | B2 | 2/2004 | Stewart |
| 6,697,734 | B1 | 2/2004 | Suomela |
| 6,711,408 | B1 | 3/2004 | Raith |
| 6,711,474 | B1 | 3/2004 | Treyz et al. |
| 6,714,791 | B2 | 3/2004 | Friedman |
| 6,718,344 | B2 | 4/2004 | Hirono |
| 6,721,572 | B1 | 4/2004 | Smith et al. |
| 6,731,236 | B1 | 5/2004 | Hager et al. |
| 6,731,238 | B2 | 5/2004 | Johnson |
| 6,732,047 | B1 | 5/2004 | de Silva |
| 6,738,808 | B1 | 5/2004 | Zellner et al. |
| 6,741,188 | B1 | 5/2004 | Miller et al. |
| 6,741,926 | B1 | 5/2004 | Zhao et al. |
| 6,748,226 | B1 | 6/2004 | Wortham |
| 6,748,318 | B1 | 6/2004 | Jones |
| 6,750,883 | B1 | 6/2004 | Parupudi et al. |
| 6,759,960 | B2 | 7/2004 | Stewart |
| 6,762,772 | B1 | 7/2004 | Imamura et al. |
| 6,766,174 | B1 | 7/2004 | Kenyon |
| 6,781,575 | B1 | 8/2004 | Hawkins et al. |
| 6,782,278 | B2 | 8/2004 | Chen et al. |
| 6,789,012 | B1 | 9/2004 | Childs et al. |
| 6,795,686 | B2 | 9/2004 | Master et al. |
| 6,801,855 | B1 | 10/2004 | Walters et al. |
| 6,810,323 | B1 | 10/2004 | Bullock et al. |
| 6,813,501 | B2 | 11/2004 | Kinnunen et al. |
| 6,813,503 | B1 | 11/2004 | Zillikens et al. |
| 6,816,782 | B1 | 11/2004 | Walters et al. |
| 6,819,919 | B1 | 11/2004 | Tanaka |
| 6,823,188 | B1 | 11/2004 | Stern |
| 6,834,195 | B2 | 12/2004 | Brandenberg et al. |

| | | | | | | |
|---|---|---|---|---|---|---|
| 6,845,318 B1 | 1/2005 | Moore et al. | | 7,373,246 B2 | 5/2008 | O'Clair |
| 6,847,891 B2 | 1/2005 | Pietras et al. | | 7,386,396 B2 | 6/2008 | Johnson |
| 6,847,969 B1 | 1/2005 | Mathai et al. | | 7,389,179 B2 | 6/2008 | Jin et al. |
| 6,853,911 B1 | 2/2005 | Sakarya | | 7,392,017 B2 | 6/2008 | Chu et al. |
| 6,853,917 B2 | 2/2005 | Miwa | | 7,395,031 B1 | 7/2008 | Ritter |
| 6,859,149 B1 | 2/2005 | Ohta | | 7,418,402 B2 | 8/2008 | McCrossin et al. |
| 6,865,483 B1 | 3/2005 | Cook, III et al. | | 7,421,422 B2 | 9/2008 | Dempster et al. |
| 6,868,074 B1 | 3/2005 | Hanson | | 7,421,486 B1 | 9/2008 | Parupudi et al. |
| 6,871,144 B1 | 3/2005 | Lee | | 7,426,437 B2 | 9/2008 | Breed et al. |
| 6,882,313 B1 | 4/2005 | Fan et al. | | 7,427,021 B2 | 9/2008 | Kemper et al. |
| 6,888,536 B2 | 5/2005 | Westerman et al. | | 7,433,694 B2 | 10/2008 | Morgan et al. |
| 6,909,902 B1 | 6/2005 | Sawada et al. | | 7,440,842 B1 | 10/2008 | Vorona |
| 6,912,398 B1 | 6/2005 | Domnitz | | 7,466,235 B1 | 12/2008 | Kolb et al. |
| 6,914,626 B2 | 7/2005 | Squibbs | | 7,483,944 B2 | 1/2009 | Parupudi et al. |
| 6,915,208 B2 | 7/2005 | Garin et al. | | 7,486,201 B2 | 2/2009 | Kelly et al. |
| 6,933,841 B2 | 8/2005 | Muramatsu et al. | | 7,500,607 B2 | 3/2009 | Williams |
| 6,944,447 B2 | 9/2005 | Portman et al. | | 7,512,487 B1 | 3/2009 | Golding et al. |
| 6,948,656 B2 | 9/2005 | Williams | | 7,522,927 B2 | 4/2009 | Fitch et al. |
| 6,952,181 B2 | 10/2005 | Karr et al. | | 7,525,484 B2 | 4/2009 | Dupray et al. |
| 6,954,646 B2 | 10/2005 | Churt | | 7,536,388 B2 | 5/2009 | Jung et al. |
| 6,954,735 B1 | 10/2005 | Djupsjobacka et al. | | 7,545,281 B2 | 6/2009 | Richards et al. |
| 6,957,072 B2 | 10/2005 | Kangras et al. | | 7,558,696 B2 | 7/2009 | Vilppula et al. |
| 6,975,959 B2 | 12/2005 | Dietrich et al. | | 7,565,132 B2 | 7/2009 | Ben Ayed |
| 6,980,909 B2 | 12/2005 | Root et al. | | 7,565,157 B1 | 7/2009 | Ortega et al. |
| 6,990,495 B1 | 1/2006 | Grason et al. | | 7,574,222 B2 | 8/2009 | Sawada et al. |
| 6,999,779 B1 | 2/2006 | Hashimoto | | 7,577,448 B2 | 8/2009 | Pande et al. |
| 7,003,289 B1 | 2/2006 | Kolls | | 7,587,345 B2 | 9/2009 | Mann et al. |
| 7,009,556 B2 | 3/2006 | Stewart | | 7,593,740 B2 | 9/2009 | Crowley et al. |
| 7,031,725 B2 | 4/2006 | Rorabaugh | | 7,593,991 B2 | 9/2009 | Friedman et al. |
| 7,044,372 B2 | 5/2006 | Okuda et al. | | 7,599,795 B1 | 10/2009 | Blumberg et al. |
| 7,058,594 B2 | 6/2006 | Stewart | | 7,603,233 B2 | 10/2009 | Tashiro |
| 7,076,255 B2 | 7/2006 | Parupudi et al. | | 7,606,580 B2 | 10/2009 | Granito et al. |
| 7,082,365 B2 | 7/2006 | Sheha et al. | | 7,617,044 B2 | 11/2009 | Lee |
| 7,089,264 B1 | 8/2006 | Guido et al. | | 7,620,404 B2 | 11/2009 | Chesnais et al. |
| 7,096,029 B1 | 8/2006 | Parupudi et al. | | 7,623,848 B2 | 11/2009 | Rosenfelt et al. |
| 7,096,030 B2 | 8/2006 | Huomo | | 7,624,358 B2 | 11/2009 | Kim et al. |
| 7,103,470 B2 | 9/2006 | Mintz | | 7,647,174 B2 | 1/2010 | Kwon |
| 7,117,015 B2 | 10/2006 | Scheinert et al. | | 7,680,591 B2 | 3/2010 | Nagata et al. |
| 7,120,469 B1 | 10/2006 | Urakawa | | 7,689,916 B1 | 3/2010 | Goel et al. |
| 7,123,189 B2 | 10/2006 | Lalik et al. | | 7,710,290 B2 | 5/2010 | Johnson |
| 7,123,926 B2 | 10/2006 | Himmelstein | | 7,711,478 B2 | 5/2010 | Gluck |
| 7,146,298 B2 | 12/2006 | Motamedi et al. | | 7,714,778 B2 | 5/2010 | Dupray |
| 7,149,503 B2 | 12/2006 | Aarnio et al. | | 7,729,691 B2 | 6/2010 | Newville |
| 7,151,921 B2 | 12/2006 | Otsuka | | 7,739,040 B2 | 6/2010 | Horvitz |
| 7,165,725 B2 | 1/2007 | Casey | | 7,743,074 B1 | 6/2010 | Parupudi et al. |
| 7,171,190 B2 | 1/2007 | Ye et al. | | 7,756,639 B2 | 7/2010 | Colley et al. |
| 7,181,189 B2 | 2/2007 | Hotta et al. | | 7,768,395 B2 | 8/2010 | Gold |
| 7,187,997 B2 | 3/2007 | Johnson | | 7,792,273 B2 | 9/2010 | Fano et al. |
| 7,200,409 B1 | 4/2007 | Ichikawa et al. | | 7,811,203 B2 | 10/2010 | Unuma et al. |
| 7,200,566 B1 | 4/2007 | Moore et al. | | 7,848,388 B2 | 12/2010 | Tudosoiu |
| 7,213,048 B1 | 5/2007 | Parupudi et al. | | 7,848,765 B2 | 12/2010 | Phillips et al. |
| 7,215,967 B1 | 5/2007 | Kransmo et al. | | 7,860,758 B2 | 12/2010 | McCrossin et al. |
| 7,236,883 B2 | 6/2007 | Garin et al. | | 7,890,123 B2 | 2/2011 | Granito et al. |
| 7,254,481 B2 | 8/2007 | Yamada et al. | | 7,933,612 B2 | 4/2011 | Counts et al. |
| 7,256,711 B2 | 8/2007 | Sheha et al. | | 7,933,929 B1 | 4/2011 | McClendon et al. |
| 7,257,392 B2 | 8/2007 | Tang et al. | | 7,941,188 B2 | 5/2011 | Jung et al. |
| 7,260,378 B2 | 8/2007 | Holland et al. | | 7,991,432 B2 | 8/2011 | Silverbrook et al. |
| 7,266,376 B2 | 9/2007 | Nakagawa | | 8,036,630 B2 | 10/2011 | Park et al. |
| 7,269,601 B2 | 9/2007 | Kinno et al. | | 8,046,009 B2 | 10/2011 | Bodmer et al. |
| 7,271,765 B2 | 9/2007 | Stilp et al. | | 2001/0018349 A1 | 8/2001 | Kinnunen et al. |
| 7,272,403 B2 | 9/2007 | Creamer et al. | | 2001/0046884 A1 | 11/2001 | Yoshioka |
| 7,272,404 B2 | 9/2007 | Overy et al. | | 2002/0032035 A1 | 3/2002 | Teshima |
| 7,274,332 B1 | 9/2007 | Dupray | | 2002/0035493 A1 | 3/2002 | Mozayeny et al. |
| 7,274,939 B2 | 9/2007 | Ruutu et al. | | 2002/0035609 A1 | 3/2002 | Lessard et al. |
| 7,280,822 B2 | 10/2007 | Fraccaroli | | 2002/0042266 A1 | 4/2002 | Heyward et al. |
| 7,295,556 B2 | 11/2007 | Roese et al. | | 2002/0046069 A1 | 4/2002 | Mozayeny et al. |
| 7,295,925 B2 | 11/2007 | Breed et al. | | 2002/0046077 A1 | 4/2002 | Mozayeny et al. |
| 7,298,327 B2 | 11/2007 | Dupray et al. | | 2002/0046084 A1 | 4/2002 | Steele et al. |
| 7,299,008 B2 | 11/2007 | Gluck | | 2002/0055373 A1 | 5/2002 | King et al. |
| 7,310,516 B1 | 12/2007 | Vacanti | | 2002/0067353 A1 | 6/2002 | Kenyon et al. |
| 7,313,467 B2 | 12/2007 | Breed et al. | | 2002/0077144 A1 | 6/2002 | Keller et al. |
| 7,319,412 B1 | 1/2008 | Coppinger et al. | | 2002/0087505 A1 | 7/2002 | Smith et al. |
| 7,336,928 B2 | 2/2008 | Paalasmaa et al. | | 2002/0091991 A1 | 7/2002 | Castro |
| 7,336,949 B2 | 2/2008 | Nasielski | | 2002/0095486 A1 | 7/2002 | Bahl |
| 7,339,496 B2 | 3/2008 | Endo et al. | | 2002/0126146 A1 | 9/2002 | Burns et al. |
| 7,343,564 B2 | 3/2008 | Othmer | | 2002/0128773 A1 | 9/2002 | Chowanic et al. |
| 7,349,706 B2 | 3/2008 | Kim et al. | | 2002/0132625 A1 | 9/2002 | Ogino et al. |
| 7,359,713 B1 | 4/2008 | Tiwari | | 2002/0140560 A1 | 10/2002 | Altman et al. |
| 7,370,283 B2 | 5/2008 | Othmer | | 2002/0160815 A1 | 10/2002 | Patel et al. |

| | | |
|---|---|---|
| 2002/0167442 A1 | 11/2002 | Taylor |
| 2002/0173905 A1 | 11/2002 | Jin et al. |
| 2003/0014181 A1 | 1/2003 | Myr |
| 2003/0016804 A1 | 1/2003 | Sheha et al. |
| 2003/0032404 A1 | 2/2003 | Wager et al. |
| 2003/0055560 A1 | 3/2003 | Phillips et al. |
| 2003/0060212 A1 | 3/2003 | Thomas |
| 2003/0060215 A1 | 3/2003 | Graham |
| 2003/0060973 A1 | 3/2003 | Mathews et al. |
| 2003/0060976 A1 | 3/2003 | Sato et al. |
| 2003/0065934 A1 | 4/2003 | Angelo et al. |
| 2003/0069029 A1 | 4/2003 | Dowling et al. |
| 2003/0069683 A1 | 4/2003 | Lapidot et al. |
| 2003/0078054 A1 | 4/2003 | Okuda |
| 2003/0078055 A1 | 4/2003 | Smith et al. |
| 2003/0078057 A1 | 4/2003 | Watanabe et al. |
| 2003/0093217 A1 | 5/2003 | Petzold et al. |
| 2003/0096620 A1 | 5/2003 | Ozturk et al. |
| 2003/0100326 A1 | 5/2003 | Grube et al. |
| 2003/0100334 A1 | 5/2003 | Mazzara, Jr. |
| 2003/0101225 A1 | 5/2003 | Han et al. |
| 2003/0120423 A1 | 6/2003 | Cochlovius et al. |
| 2003/0134657 A1 | 7/2003 | Norta et al. |
| 2003/0140136 A1 | 7/2003 | Nakamura |
| 2003/0144793 A1 | 7/2003 | Melaku et al. |
| 2003/0148774 A1 | 8/2003 | Naghian et al. |
| 2003/0158655 A1 | 8/2003 | Obradovich et al. |
| 2003/0191578 A1 | 10/2003 | Paulauskas et al. |
| 2003/0236106 A1 | 12/2003 | Master et al. |
| 2004/0010358 A1 | 1/2004 | Oesterling et al. |
| 2004/0036649 A1 | 2/2004 | Taylor |
| 2004/0054428 A1 | 3/2004 | Sheha et al. |
| 2004/0059502 A1 | 3/2004 | Levi et al. |
| 2004/0068439 A1 | 4/2004 | Elgrably |
| 2004/0072577 A1 | 4/2004 | Myllymaki et al. |
| 2004/0073361 A1 | 4/2004 | Tzamaloukas et al. |
| 2004/0082351 A1 | 4/2004 | Westman |
| 2004/0083050 A1 | 4/2004 | Biyani |
| 2004/0093155 A1 | 5/2004 | Simonds |
| 2004/0104842 A1 | 6/2004 | Drury et al. |
| 2004/0110515 A1 | 6/2004 | Blumberg et al. |
| 2004/0128067 A1 | 7/2004 | Smith |
| 2004/0151151 A1 | 8/2004 | Kubler et al. |
| 2004/0158401 A1 | 8/2004 | Yoon |
| 2004/0158584 A1 | 8/2004 | Necsoiu et al. |
| 2004/0172409 A1 | 9/2004 | James |
| 2004/0176907 A1 | 9/2004 | Nesbitt |
| 2004/0180669 A1 | 9/2004 | Kall |
| 2004/0192299 A1 | 9/2004 | Wilson et al. |
| 2004/0198335 A1 | 10/2004 | Campen |
| 2004/0198379 A1 | 10/2004 | Magee et al. |
| 2004/0198397 A1 | 10/2004 | Weiss |
| 2004/0203569 A1 | 10/2004 | Jijina et al. |
| 2004/0203746 A1 | 10/2004 | Knauerhase et al. |
| 2004/0203836 A1 | 10/2004 | Gorday et al. |
| 2004/0203880 A1 | 10/2004 | Riley |
| 2004/0203909 A1 | 10/2004 | Koster |
| 2004/0215707 A1 | 10/2004 | Fujita et al. |
| 2004/0225436 A1 | 11/2004 | Yoshihashi |
| 2004/0228330 A1 | 11/2004 | Kubler et al. |
| 2004/0236504 A1 | 11/2004 | Bickford et al. |
| 2004/0242149 A1 | 12/2004 | Luneau |
| 2004/0246940 A1 | 12/2004 | Kubler et al. |
| 2004/0248586 A1 | 12/2004 | Patel et al. |
| 2004/0260939 A1 | 12/2004 | Ichikawa et al. |
| 2004/0263084 A1 | 12/2004 | Mor et al. |
| 2004/0264442 A1 | 12/2004 | Kubler et al. |
| 2005/0002419 A1 | 1/2005 | Doviak et al. |
| 2005/0004838 A1 | 1/2005 | Perkowski et al. |
| 2005/0009511 A1 | 1/2005 | Bostrom et al. |
| 2005/0027442 A1 | 2/2005 | Kelley et al. |
| 2005/0033515 A1 | 2/2005 | Bozzone |
| 2005/0037781 A1 | 2/2005 | Ozugur et al. |
| 2005/0039140 A1 | 2/2005 | Chen |
| 2005/0046584 A1 | 3/2005 | Breed |
| 2005/0071078 A1 | 3/2005 | Yamada et al. |
| 2005/0071702 A1 | 3/2005 | Morisawa |
| 2005/0075116 A1 | 4/2005 | Laird |
| 2005/0085272 A1 | 4/2005 | Anderson et al. |
| 2005/0091408 A1 | 4/2005 | Parupudi et al. |
| 2005/0096840 A1 | 5/2005 | Simske |
| 2005/0114021 A1 | 5/2005 | Krull et al. |
| 2005/0130677 A1 | 6/2005 | Meunier et al. |
| 2005/0134440 A1 | 6/2005 | Breed |
| 2005/0134578 A1 | 6/2005 | Chambers et al. |
| 2005/0149250 A1 | 7/2005 | Isaac |
| 2005/0153681 A1 | 7/2005 | Hanson |
| 2005/0176411 A1 | 8/2005 | Taya |
| 2005/0186954 A1 | 8/2005 | Kenney |
| 2005/0192025 A1 | 9/2005 | Kaplan |
| 2005/0197767 A1 | 9/2005 | Nortrup |
| 2005/0203698 A1 | 9/2005 | Lee |
| 2005/0221799 A1 | 10/2005 | Tervo et al. |
| 2005/0221808 A1 | 10/2005 | Karlsson et al. |
| 2005/0221843 A1 | 10/2005 | Friedman et al. |
| 2005/0222756 A1 | 10/2005 | Davis et al. |
| 2005/0222763 A1 | 10/2005 | Uyeki |
| 2005/0227709 A1 | 10/2005 | Chang et al. |
| 2005/0228860 A1 | 10/2005 | Hamynen et al. |
| 2005/0234637 A1 | 10/2005 | Obradovich et al. |
| 2005/0239477 A1 | 10/2005 | Kim et al. |
| 2005/0250440 A1 | 11/2005 | Zhou et al. |
| 2005/0256639 A1 | 11/2005 | Aleksic et al. |
| 2005/0286421 A1 | 12/2005 | Janacek |
| 2006/0009908 A1 | 1/2006 | Tomita et al. |
| 2006/0015249 A1 | 1/2006 | Gieseke |
| 2006/0022048 A1 | 2/2006 | Johnson |
| 2006/0025158 A1 | 2/2006 | Leblanc et al. |
| 2006/0029109 A1 | 2/2006 | Moran |
| 2006/0038719 A1 | 2/2006 | Pande et al. |
| 2006/0041374 A1 | 2/2006 | Inoue |
| 2006/0041377 A1 | 2/2006 | Jung et al. |
| 2006/0041378 A1 | 2/2006 | Cheng et al. |
| 2006/0056388 A1 | 3/2006 | Livingwood |
| 2006/0058955 A1 | 3/2006 | Mehren |
| 2006/0063539 A1* | 3/2006 | Beyer, Jr. .................. 455/456.3 |
| 2006/0068809 A1 | 3/2006 | Wengler et al. |
| 2006/0069503 A1 | 3/2006 | Suomela |
| 2006/0085392 A1 | 4/2006 | Wang et al. |
| 2006/0094353 A1 | 5/2006 | Nielson et al. |
| 2006/0101005 A1 | 5/2006 | Yang et al. |
| 2006/0111122 A1 | 5/2006 | Carlsan et al. |
| 2006/0116137 A1 | 6/2006 | Jung |
| 2006/0148463 A1 | 7/2006 | Zhu et al. |
| 2006/0149461 A1 | 7/2006 | Rowley |
| 2006/0150119 A1 | 7/2006 | Chesnais et al. |
| 2006/0166679 A1 | 7/2006 | Karaoguz et al. |
| 2006/0168300 A1 | 7/2006 | An et al. |
| 2006/0172769 A1 | 8/2006 | Oh |
| 2006/0172778 A1 | 8/2006 | Sundararajan et al. |
| 2006/0179114 A1 | 8/2006 | Deeds |
| 2006/0180649 A1 | 8/2006 | Casey |
| 2006/0184978 A1 | 8/2006 | Casey |
| 2006/0195481 A1 | 8/2006 | Arrouye et al. |
| 2006/0199567 A1 | 9/2006 | Alston |
| 2006/0202819 A1 | 9/2006 | Adamczyk et al. |
| 2006/0211453 A1 | 9/2006 | Schick |
| 2006/0218209 A1 | 9/2006 | Arrouye et al. |
| 2006/0227047 A1 | 10/2006 | Rosenberg |
| 2006/0229802 A1 | 10/2006 | Vertelney et al. |
| 2006/0237385 A1 | 10/2006 | Baker |
| 2006/0247855 A1* | 11/2006 | de Silva et al. ................ 701/212 |
| 2006/0251034 A1 | 11/2006 | Park |
| 2006/0270421 A1 | 11/2006 | Phillips et al. |
| 2006/0271280 A1 | 11/2006 | O'Clair |
| 2006/0284767 A1 | 12/2006 | Taylor |
| 2006/0287824 A1 | 12/2006 | Lin |
| 2006/0291639 A1 | 12/2006 | Radziewicz et al. |
| 2006/0293029 A1 | 12/2006 | Jha et al. |
| 2006/0293083 A1 | 12/2006 | Bowen |
| 2007/0001875 A1 | 1/2007 | Taylor |
| 2007/0003040 A1 | 1/2007 | Radziewicz et al. |
| 2007/0005188 A1 | 1/2007 | Johnson |
| 2007/0005233 A1 | 1/2007 | Pinkus et al. |
| 2007/0006098 A1 | 1/2007 | Krumm et al. |
| 2007/0008515 A1 | 1/2007 | Otani et al. |
| 2007/0010942 A1 | 1/2007 | Bill |
| 2007/0016362 A1 | 1/2007 | Nelson |

| | | | | | | |
|---|---|---|---|---|---|---|
| 2007/0027614 A1 | 2/2007 | Reeser et al. | | 2008/0052407 A1 | 2/2008 | Baudino et al. |
| 2007/0027628 A1 | 2/2007 | Geelen | | 2008/0065311 A1 | 3/2008 | Bauchot et al. |
| 2007/0042790 A1 | 2/2007 | Mohi et al. | | 2008/0070593 A1 | 3/2008 | Altman et al. |
| 2007/0055684 A1 | 3/2007 | Steven | | 2008/0071466 A1 | 3/2008 | Downs et al. |
| 2007/0060328 A1 | 3/2007 | Zrike et al. | | 2008/0082254 A1 | 4/2008 | Huhtala et al. |
| 2007/0061245 A1 | 3/2007 | Ramer et al. | | 2008/0085727 A1 | 4/2008 | Kratz |
| 2007/0061301 A1 | 3/2007 | Ramer et al. | | 2008/0086240 A1 | 4/2008 | Breed |
| 2007/0061363 A1 | 3/2007 | Ramer et al. | | 2008/0088486 A1 | 4/2008 | Rozum et al. |
| 2007/0071114 A1 | 3/2007 | Sanderford et al. | | 2008/0091347 A1 | 4/2008 | Tashiro |
| 2007/0073480 A1 | 3/2007 | Singh | | 2008/0096518 A1 | 4/2008 | Mock et al. |
| 2007/0073719 A1 | 3/2007 | Ramer et al. | | 2008/0097698 A1 | 4/2008 | Arnold-Huyser et al. |
| 2007/0087726 A1 | 4/2007 | McGary et al. | | 2008/0098090 A1 | 4/2008 | Geraci et al. |
| 2007/0093258 A1 | 4/2007 | Steenstra et al. | | 2008/0104634 A1 | 5/2008 | Gajdos et al. |
| 2007/0106465 A1 | 5/2007 | Adam et al. | | 2008/0109153 A1 | 5/2008 | Gueziec |
| 2007/0115868 A1 | 5/2007 | Chen et al. | | 2008/0113672 A1 | 5/2008 | Karr et al. |
| 2007/0124043 A1 | 5/2007 | Ayoub et al. | | 2008/0129528 A1 | 6/2008 | Guthrie |
| 2007/0124058 A1 | 5/2007 | Kitagawa et al. | | 2008/0132243 A1 | 6/2008 | Spalink et al. |
| 2007/0124066 A1 | 5/2007 | Kikuchi | | 2008/0132251 A1 | 6/2008 | Altman et al. |
| 2007/0127439 A1 | 6/2007 | Stein | | 2008/0132252 A1 | 6/2008 | Altman et al. |
| 2007/0127661 A1 | 6/2007 | Didcock | | 2008/0140308 A1 | 6/2008 | Yamane et al. |
| 2007/0129888 A1 | 6/2007 | Rosenberg | | 2008/0140520 A1 | 6/2008 | Hyder et al. |
| 2007/0130153 A1 | 6/2007 | Nachman et al. | | 2008/0153512 A1 | 6/2008 | Kale et al. |
| 2007/0135136 A1 | 6/2007 | Ische | | 2008/0153513 A1 | 6/2008 | Flake et al. |
| 2007/0135990 A1 | 6/2007 | Seymour et al. | | 2008/0155453 A1 | 6/2008 | Othmer |
| 2007/0142026 A1 | 6/2007 | Kuz et al. | | 2008/0160956 A1 | 7/2008 | Jackson et al. |
| 2007/0149212 A1 | 6/2007 | Gupta et al. | | 2008/0161034 A1 | 7/2008 | Akiyama |
| 2007/0150320 A1 | 6/2007 | Huang | | 2008/0167083 A1 | 7/2008 | Wyld et al. |
| 2007/0153983 A1 | 7/2007 | Bloebaum et al. | | 2008/0167796 A1 | 7/2008 | Narayanaswami |
| 2007/0153984 A1 | 7/2007 | Bloebaum et al. | | 2008/0167811 A1 | 7/2008 | Geelen |
| 2007/0153986 A1 | 7/2007 | Bloebaum et al. | | 2008/0172173 A1 | 7/2008 | Chang et al. |
| 2007/0155360 A1 | 7/2007 | An | | 2008/0172374 A1 | 7/2008 | Wolosin et al. |
| 2007/0156326 A1 | 7/2007 | Nesbitt | | 2008/0176545 A1 | 7/2008 | Dicke et al. |
| 2007/0162224 A1 | 7/2007 | Luo | | 2008/0177793 A1 | 7/2008 | Epstein et al. |
| 2007/0179854 A1 | 8/2007 | Ziv et al. | | 2008/0178116 A1 | 7/2008 | Kim |
| 2007/0184855 A1 | 8/2007 | Klassen | | 2008/0186162 A1 | 8/2008 | Rajan et al. |
| 2007/0191029 A1 | 8/2007 | Zarem et al. | | 2008/0189033 A1 | 8/2008 | Geelen et al. |
| 2007/0200713 A1 | 8/2007 | Weber et al. | | 2008/0194273 A1 | 8/2008 | Kansal et al. |
| 2007/0204218 A1 | 8/2007 | Weber et al. | | 2008/0200142 A1 | 8/2008 | Abdel-Kader et al. |
| 2007/0206730 A1 | 9/2007 | Polk | | 2008/0207167 A1 | 8/2008 | Bugenhagen |
| 2007/0208492 A1 | 9/2007 | Downs et al. | | 2008/0225779 A1 | 9/2008 | Bragiel et al. |
| 2007/0208497 A1 | 9/2007 | Downs et al. | | 2008/0227473 A1 | 9/2008 | Haney |
| 2007/0208498 A1 | 9/2007 | Barker et al. | | 2008/0233919 A1 | 9/2008 | Kenney |
| 2007/0218925 A1 | 9/2007 | Islam et al. | | 2008/0248815 A1 | 10/2008 | Busch |
| 2007/0219706 A1 | 9/2007 | Sheynblat | | 2008/0249667 A1 | 10/2008 | Horvitz et al. |
| 2007/0229549 A1 | 10/2007 | Dicke et al. | | 2008/0268876 A1 | 10/2008 | Gelfand et al. |
| 2007/0232272 A1 | 10/2007 | Gonsalves et al. | | 2008/0271072 A1 | 10/2008 | Rothschild et al. |
| 2007/0232326 A1 | 10/2007 | Johnson | | 2008/0284642 A1 | 11/2008 | Seacat et al. |
| 2007/0233387 A1 | 10/2007 | Johnson | | 2008/0287124 A1 | 11/2008 | Karabinis |
| 2007/0238491 A1 | 10/2007 | He | | 2008/0288166 A1 | 11/2008 | Onishi |
| 2007/0243853 A1 | 10/2007 | Bumiller et al. | | 2008/0293397 A1 | 11/2008 | Gajdos et al. |
| 2007/0247435 A1 | 10/2007 | Benko et al. | | 2008/0310850 A1 | 12/2008 | Pederson et al. |
| 2007/0254676 A1 | 11/2007 | Pedigo et al. | | 2008/0318550 A1 | 12/2008 | DeAtley |
| 2007/0259674 A1 | 11/2007 | Neef et al. | | 2008/0319644 A1 | 12/2008 | Zehler |
| 2007/0260751 A1 | 11/2007 | Meesseman | | 2008/0319652 A1 | 12/2008 | Moshfeghi |
| 2007/0266116 A1 | 11/2007 | Rensin et al. | | 2009/0003659 A1 | 1/2009 | Forstall et al. |
| 2007/0271328 A1 | 11/2007 | Geelen et al. | | 2009/0005005 A1 | 1/2009 | Forstall et al. |
| 2007/0276586 A1 | 11/2007 | Jeon et al. | | 2009/0005018 A1 | 1/2009 | Forstall et al. |
| 2007/0276587 A1 | 11/2007 | Johnson | | 2009/0005021 A1 | 1/2009 | Forstall et al. |
| 2007/0276596 A1 | 11/2007 | Solomon et al. | | 2009/0005068 A1 | 1/2009 | Forstall et al. |
| 2007/0281664 A1 | 12/2007 | Kaneko et al. | | 2009/0005070 A1 | 1/2009 | Forstall et al. |
| 2007/0282521 A1 | 12/2007 | Broughton | | 2009/0005071 A1 | 1/2009 | Forstall et al. |
| 2007/0282565 A1 | 12/2007 | Bye et al. | | 2009/0005072 A1 | 1/2009 | Forstall et al. |
| 2007/0290920 A1 | 12/2007 | Shintai et al. | | 2009/0005076 A1 | 1/2009 | Forstall et al. |
| 2007/0299601 A1 | 12/2007 | Zhao et al. | | 2009/0005080 A1 | 1/2009 | Forstall et al. |
| 2008/0004789 A1 | 1/2008 | Horvitz et al. | | 2009/0005082 A1 | 1/2009 | Forstall et al. |
| 2008/0004791 A1 | 1/2008 | Sera | | 2009/0005964 A1 | 1/2009 | Forstall et al. |
| 2008/0004802 A1 | 1/2008 | Horvitz | | 2009/0005965 A1 | 1/2009 | Forstall et al. |
| 2008/0005104 A1 | 1/2008 | Flake et al. | | 2009/0005975 A1 | 1/2009 | Forstall et al. |
| 2008/0005301 A1 | 1/2008 | Li et al. | | 2009/0005978 A1 | 1/2009 | Forstall et al. |
| 2008/0015422 A1 | 1/2008 | Wessel | | 2009/0005981 A1 | 1/2009 | Forstall et al. |
| 2008/0021632 A1 | 1/2008 | Amano | | 2009/0006336 A1 | 1/2009 | Forstall et al. |
| 2008/0024360 A1 | 1/2008 | Taylor | | 2009/0030605 A1 | 1/2009 | Breed |
| 2008/0024364 A1 | 1/2008 | Taylor | | 2009/0031006 A1 | 1/2009 | Johnson |
| 2008/0027636 A1 | 1/2008 | Tengler et al. | | 2009/0033540 A1 | 2/2009 | Breed et al. |
| 2008/0030308 A1 | 2/2008 | Johnson | | 2009/0042585 A1 | 2/2009 | Matsuda |
| 2008/0032703 A1 | 2/2008 | Krumm et al. | | 2009/0089706 A1 | 4/2009 | Furches et al. |
| 2008/0032721 A1 | 2/2008 | MacDonald et al. | | 2009/0098857 A1 | 4/2009 | DeAtley |
| 2008/0045234 A1 | 2/2008 | Reed | | 2009/0121927 A1 | 5/2009 | Moshfeghi |
| 2008/0046176 A1 | 2/2008 | Jurgens | | 2009/0177385 A1 | 7/2009 | Matas et al. |

| | | | |
|---|---|---|---|
| 2009/0182492 A1 | 7/2009 | Alten | |
| 2009/0197612 A1 | 8/2009 | Kiiskinen | |
| 2009/0201850 A1 | 8/2009 | Davis | |
| 2009/0215469 A1 | 8/2009 | Fisher | |
| 2009/0228961 A1 | 9/2009 | Wald et al. | |
| 2009/0234743 A1 | 9/2009 | Wald et al. | |
| 2009/0259573 A1 | 10/2009 | Cheng et al. | |
| 2009/0271271 A1 | 10/2009 | Johnson | |
| 2009/0281724 A1 | 11/2009 | Blumenberg et al. | |
| 2009/0286549 A1 | 11/2009 | Sazegari et al. | |
| 2010/0076818 A1* | 3/2010 | Peterson et al. | 705/10 |
| 2010/0082820 A1 | 4/2010 | Furukawa | |
| 2010/0106397 A1 | 4/2010 | Van Essen | |
| 2010/0131584 A1 | 5/2010 | Johnson | |
| 2010/0173647 A1 | 7/2010 | Sheynblat | |
| 2010/0207782 A1 | 8/2010 | Johnson | |
| 2011/0051658 A1 | 3/2011 | Jin et al. | |

FOREIGN PATENT DOCUMENTS

| | | |
|---|---|---|
| CA | 2163215 | 5/1994 |
| CA | 2287596 | 4/2000 |
| CA | 2432239 | 12/2004 |
| DE | 3 621 456 | 1/1988 |
| DE | 4437360 | 4/1996 |
| DE | 19506890 | 8/1996 |
| DE | 19914257 | 3/1999 |
| DE | 10 141 695 | 3/2003 |
| EP | 0 288 068 | 7/1992 |
| EP | 0 633 452 | 1/1995 |
| EP | 0 745 867 | 12/1996 |
| EP | 0 762 362 | 3/1997 |
| EP | 0 763 749 | 3/1997 |
| EP | 0 786 646 | 7/1997 |
| EP | 785535 | 7/1997 |
| EP | 0 813 072 | 12/1997 |
| EP | 0 699 330 B1 | 4/1998 |
| EP | 0 908 835 | 4/1999 |
| EP | 0 997 808 | 5/2000 |
| EP | 1 083 764 | 3/2001 |
| EP | 1 251 362 | 10/2002 |
| EP | 1 300 652 | 4/2003 |
| EP | 1 457 928 | 9/2004 |
| EP | 1 469 287 | 10/2004 |
| EP | 1 496 338 | 1/2005 |
| EP | 1 770 956 A1 | 9/2005 |
| EP | 1 465 041 | 2/2006 |
| EP | 1 659 817 | 5/2006 |
| EP | 1 672 474 | 6/2006 |
| EP | 1 790 947 | 5/2007 |
| EP | 1 860 904 | 11/2007 |
| EP | 1 933 249 | 8/2008 |
| EP | 1 975 567 | 10/2008 |
| FR | 2730083 | 8/1996 |
| FR | 2754093 | 4/1998 |
| FR | 2272911 | 6/1999 |
| FR | 2810183 | 12/2001 |
| GB | 2 278 196 | 11/1994 |
| GB | 2 322 248 | 8/1998 |
| GB | 2 359 888 | 5/2001 |
| GB | 2 407 230 A | 4/2005 |
| JP | 62142215 | 6/1987 |
| JP | 05-071974 | 3/1993 |
| JP | 06-525189 | 5/1994 |
| JP | 2007-221433 | 5/1994 |
| JP | 08-069436 | 3/1996 |
| JP | 09-054895 | 2/1997 |
| JP | 09-098474 | 4/1997 |
| JP | 9-113288 | 5/1997 |
| JP | 09-153125 | 6/1997 |
| JP | 9-062993 | 7/1997 |
| JP | 09-200850 | 7/1997 |
| JP | 9-210710 | 8/1997 |
| JP | 9-319300 | 12/1997 |
| JP | 10-021259 | 1/1998 |
| JP | 11-234736 | 8/1999 |
| JP | 2000-163379 | 6/2000 |
| JP | 2001-008270 | 1/2001 |
| JP | 2001-160063 | 6/2001 |
| JP | 2002-310680 | 10/2002 |
| JP | 10-030933 | 2/2003 |
| JP | 2003-228532 | 8/2003 |
| JP | 2004-045054 | 2/2004 |
| JP | 2004-219146 | 7/2004 |
| JP | 2004-362271 | 12/2004 |
| JP | 2005-106741 | 4/2005 |
| JP | 2005-182146 | 7/2005 |
| JP | 2005-241519 | 9/2005 |
| JP | 2005/277764 | 10/2005 |
| JP | 2006-112338 | 4/2006 |
| JP | 2006-184007 | 7/2006 |
| JP | 2006-270889 | 10/2006 |
| JP | 2006-279838 | 10/2006 |
| JP | 2007-033220 | 2/2007 |
| JP | 2007-033331 | 2/2007 |
| JP | 2007-033368 | 2/2007 |
| JP | 2007-127439 | 5/2007 |
| JP | 2007-147439 | 6/2007 |
| JP | 2007-201699 | 8/2007 |
| JP | 2007-240400 | 9/2007 |
| JP | 2007-259291 | 10/2007 |
| JP | 2007-271299 | 10/2007 |
| JP | 2007-304009 | 11/2007 |
| JP | 2008-058917 | 3/2008 |
| JP | 2008-129774 | 6/2008 |
| KR | 2004-102440 | 12/2004 |
| KR | 2005-096746 | 10/2005 |
| TW | 200426387 | 12/2004 |
| WO | WO 93/20546 | 10/1993 |
| WO | WO 94/08250 | 4/1994 |
| WO | WO 97/07467 | 2/1997 |
| WO | WO 97/24577 | 7/1997 |
| WO | 0 809 117 | 11/1997 |
| WO | WO 97/41654 | 11/1997 |
| WO | WO 98/03951 | 1/1998 |
| WO | WO 98/07112 | 2/1998 |
| WO | WO 98/54682 | 12/1998 |
| WO | WO 99/16036 | 4/1999 |
| WO | WO 99/44183 | 9/1999 |
| WO | WO 99/61934 | 12/1999 |
| WO | WO 01/31966 | 5/2001 |
| WO | WO 01/37597 | 5/2001 |
| WO | WO 02/33533 | 4/2002 |
| WO | WO 02/054813 | 7/2002 |
| WO | WO 03/023593 | 3/2003 |
| WO | WO 2004/008792 | 3/2003 |
| WO | WO 03/096055 | 11/2003 |
| WO | WO 2004/021730 | 3/2004 |
| WO | WO 2004/034194 | 4/2004 |
| WO | WO 2004/061576 | 7/2004 |
| WO | WO 2004/076977 | 9/2004 |
| WO | WO 2005/006258 | 1/2005 |
| WO | WO 2005/084052 | 9/2005 |
| WO | WO 2006/065856 | 6/2006 |
| WO | WO 2006/113125 | 10/2006 |
| WO | WO 2007/027065 | 3/2007 |
| WO | WO 2007/052285 | 5/2007 |
| WO | WO 2008/051929 | 5/2008 |
| WO | WO 2008/085740 | 7/2008 |
| WO | WO 2009/002942 | 12/2008 |

OTHER PUBLICATIONS

Dalrymple, "Google Maps adds locator, but not for iPhone," [online] [Retrieved Nov. 30, 2007]; Retrieved from the Internet URL: http://news.yahoo.com/s/macworld/20071130/tc_macworld/googlemaps20071130_0&printer=1;_ylt=Auvf3s6LQK_pOaJ1b954T_DQn6gB; 1 page.

Maxwell et al., "Alfred: The Robot Waiter Who Remembers You," *AAAI Technical Report WS-99-15*, 1999, 12 pages.

Shibata et al., "Development and Integration of Generic Components for a Teachable Vision-Based Mobile Robot," *IEEE/ASME Transactions on Mechatronics*, 1996, 1(3):230-236.

Yogesh C. Rathod, Third Party Submission in U.S. Appl. No. 12/233,358 mailed Mar. 30, 2010, 12 pages.

"27 Countries in your pocket"; [online] [Retrieved on Sep. 29, 2005] Retrieved from the Internet <URL: http://www.mio-tech.be/en/printview/press-releases-2005-09-29.htm; 1 page.

"Animated Transition"; [online] [Retrieved on Oct. 16, 2006] Retrieved from the Internet <URL: http://designinterfaces.com/Animated_Transition; 2 pages.

"DaimlerCrysler Guide5 Usecases Overview Map", 1 page (no reference date).

"International Roaming Guide—Personal Experience(s) from Customer and Community Member"; [online] [Retrieved Jun. 26, 2006] Retrieved from the Internet <URL: http://forums.cingular.com/cng/board/message?board.id=1185; 6 pages.

"iPhone Software/Hardware Hack: LocoGPS—GPS Add-on for the iPhone"; [online] [Retrieved on Dec. 25, 2007] Retrieved from the Internet <URL: http://www.iphonehacks.com/iphone_applications/index.html; 41 pages.

"Mio 269+ Users Manula"; 2005; 44 pages.

"New program for mobile blogging for PocketPC released: My Blog"; [online] [Retrieved on Apr. 5, 2006]; Retrieved from the Internet, URL: http://msmobiles.com/news.php/4067.html.

"Numbering and Dialing Plan within the United States", Alliance for Telecommunications Industry Solutions; 2005; 17 pages.

Review Guide—Google Maps for mobile (beta); Google; 2006; 7 pages.

"User-centered design of mobile solutions", NAMAHN, 2006, 18 pages.

"User's Manual MioMap 2.0"; Aug. 2005; 60 pages.

"Windows Live Search for Mobile Goes Final, Still Great"; [online] [Retrieved on Mar. 11, 2007]; Retrieved from the Internet, URL: http://gizmodo.com/gadgets/software/windows-live-search-for-mobile-goes-final-still-great-236002.php; 3 pages.

"Windows Mobile 6 Professional Video Tour"; [online] [Retrieved on Mar. 11, 2007]; Retrieved from the Internet, URL: http://gizmodo.com/gadgets/cellphones/windows-mobile-6-professional-video-tour-237039.php; 4 pages.

"Windows Mobile"; Microsoft; 2007, 2 pages.

Anand et al., "Quantitative Analysis of Power Consumption for Location—Aware Applications on Smart Phones", IEEE International Symposium on Industrial Electronics, 2007.

Balliet, "Transportation Information Distribution System", IBM Technical Disclosure Bulletin, [online] [Retrieved Nov. 7, 2008] Retrieved from the Internet, URL: https://www.delphion.com/tdbs/tdb?order=86A+61395; Jun. 1986; 2 pages.

Beard et al., "Estimating Positions and Paths of Moving Objects", IEEE 2000, pp. 1-8.

Bederson, B.B., Audio Augmented Reality: A Prototype Automated Tour Guide [online] [retrieved on Aug. 30, 2002] [retrieved from http://www.cs.umd.edu/~bederson/papers/chi-95-aar/] pp. 1-4.

Berman et al., "The Role of Dead Reckoning and Inertial Sensors in Future General Aviation Navigation", IEEE, 1998, pp. 510-517.

Bevly et al., "Cascaded Kalman Filters for Accurate Estimation of Multiple Biases, Dead-Reckoning Navigation, and Full State Feedback Control of Ground Vehicles", IEEE Transactions on Control Systems in Technology, vol. 15, No. 2, Mar. 2007, pp. 199-208.

Binzhuo et al., "Mobile Phone GIS Based on Mobile SVG", IEEE 2005.

Bokharouss et al., "A Location—Aware Mobile Call Handling Assistant", International Conference on Advanced Information Networking and Applications Workshops, 2007.

Boonsrimuang et al., "Mobile Internet Navigation System", IEEE, 2002, pp. 325-328.

Camp et al., "A computer-based method for predicting transit time systems", Decsision Sciences, vol. 5, pp. 339-346, 1974.

Carew; "Phones that tell you where to drive, meet, eat"; [online] [Retrieved May 26, 2007]; Retrieved from the Internet <URL httlp://news.yahoo.com/s/nm/20070525/wr_nm/column_pluggedin_dc_2&printer=1;_ylt=Ahqaftn7xm1S2r0FZFeu9G4ht.cA; 2 pages.

Charny, "AT&T puts 411 to the text"; [online] [Retrieved Mar. 4, 2009]; Retrieved from the Internet <URL http://news.cnet.com/ATT-puts-411-to-the-text/2100-1039_3-1000669.html; May 8, 2003; 2 pages.

Christie et al., "Development and Deployment of GPS wireless devices for E911 and Location based services", IEEE 2002.

Chua et al., "Intelligent Portal for Event—triggered SMS Alerts", 2nd International Conference on Mobile Technology, Applications and Systems, 2005.

Civilis et al., "Efficient Tracking of Moving Objects with Precision Guarantees", IEEE, Proceedings of the First Annual International Conference on Mobile and Ubiquitous Systems: Networking and Services, 2004, 10 pages.

Dunn et al., "Wireless Emergency Call System", IBM TDB, Sep. 1994.

Ebine, "Dual Frequency resonant base station antennas for PDC systems in Japan", IEEE, pp. 564-567, 1999.

Evans, "In-Vehicle Man-Machine Interaction the Socrates Approach", Vehicle Navigation & Information System Conference Proceedings, Aug. 31-Sep. 2, 1994, pp. 473-477.

FM 3-25.26 Map Reading and Land Navigation Field Manual No. 3-25.26, Headquarters Department of the Army, Washington, DC [online] [retrieved on Apr. 9, 2004] [retrieved from http://155.217.58.58/cgi-bin/atdl.dll/fm/3-25.26/toc.htm] Jul. 20, 2001, pp. 1-7 and J-1 to J-3.

*GPS 12 Personal Navigator Owner's Manual & Reference*, Garmin Corporation, Jan. 1999, pp. 1-60.

Guo et al., "An Intelligent Query System based on Chinese Short Message Service for Restaurant Recommendation", IEEE 2007, 1 page.

Hameed et al., "An Intelligent Agent—Based Medication and Emergency System", IEEE 2006.

Helal et al., "Drishti: An Integrated Navigation System for Visually Impaired and Disabled", Fifth International Symposium on Wearable Computers (ISWC'01), IEEE, 2001, pp. 149-156.

Hohman et al., "GPS Roadside Integrated Precision Positioning System", Position Location and Navigation Symposium (IEEE 2000), pp. 221-230.

International Numbering and SMS—Type of Numbering, TON, Numbering Plan Indicator, NPI, [online] [Retrieved Jan. 5, 2007] Retrieved from the Internet <URL: http://www.activeexperts.com/support/activsms/tonnpi/.

Jain, R., Potential Networking Applications of Global Positioning Systems (GPS) [online] [retrieved on Nov. 18, 2008] [retrieved from http://arxiv.org/ftp/cs/papers/9809/9809079.pdf] OSU Technical Report TR-24, Apr. 1996, pp. 1-40.

Jirawimut et al., "A Method for Dead Reckoning Parameter Correction in Pedestrian Navigation System", IEEE Transactions on Instrumentation and Measurement, vol. 52, No. 1, Feb. 2003, pp. 209-215.

Ju et al., "RFID Data Collection and Integration based on Mobile Agent", IEEE, 2006.

Kbar et al., "Mobile Station Location based on Hybrid of Signal Strength and Time of Arrival", IEEE, 2005.

Koide et al., "3-D Human Navigation System with Consideration of Neighboring Space Information", IEEE International Conference on Systems, Man and Cybernetics, 2006 (SMC '06), vol. 2, (Oct. 8-11, 2006), pp. 1693-1698.

Lloyd et al., "Cellular phone base stations installation violate the Electromagnetic Compatibility regulations", IEEE, 2004.

Manabe et al., "On the M-CubITS Pedestrian Navigation System", IEEE, 2006, pp. 793-798.

Meier et al., "Location-Aware Event-Base Middleware: A Paradigm for Collaborative Mobile Applications?", Sep. 2003.

Miller et al., "Synchronization of Mobile XML Databases by Utilizing Deferred Views", IEEE 2004.

Nardi et al., "Integrating Communication and Information through Contact Map", Communications of the ACM, vol. 45, No. 4, Apr. 2002.

Northard, "Docking Station Communication Link", IBM TDB, Feb. 1994.

Oh et al., "Spatial Applications Using 4S Technology for Mobile Environment", IEEE 2002.

Paksoy et al., "The Global Position System-Navigation Tool of the Future", Journal of Electrical & Electronics, 2002, vol. 2, No. 1, pp. 467-476.

Parikh, "Tele Locate", IBM Technical Disclosure Bulletin, [online] [Retrieved Nov. 7, 2008] Retrieved from the Internet, URL: https://www.delphion.com/tdbs/tdb?order=92A+62775; Sep. 1992; 1 page.

Partial International Search Report, dated Jul. 29, 2008, issued in corresponding PCT/US2008/050295.

International Search Report and Written Opinion, dated Jun. 9, 2008, issued in International Application No. PCT/US2007/088880, filed Dec. 27, 2007.

Pfoser et al., "Dynamic Travel Time Maps—Enabling Efficient Navigation", Proceedings of the 18th International Conference on Scientific and Statistical Database Management (SSDBM'06), IEEE, 10 pages.

Portfolio 2007; [online] [Retrieved on Jun. 14, 2007]; Retrieved from the Internet, URL: http://eric.wahlforss.com/folio; 3 pages.

Rekimoto, J., *Augment-able Reality: Situated Communication through Physical and Digital Spaces*, iswc, pp. 68, Second International Symposium on Wearable computers (ISWC'98), 1998, pp. 1-8.

Rogers et al., "Adaptive User Interfaces for Automotive Environments", IEEE Intelligent Vehicles Symposium 2000, Oct. 3-5, 2000, pp. 662-667.

Rozier, J., *Hear & There: An Augmented Reality System of Linked Audio*, Proceedings of the International Conference on Auditory Display, Atlanta, GA, Apr. 2000, pp. 1-6.

Samadani et al., "PathMaker: Systems for Capturing Trips", IEEE (2004) International Conference on Multimedia and Expo., Publication Date: Jun. 27-30, 2004, vol. 3, pp. 2123-2126, 2004.

Schreiner, "Where We At? Mobile Phones Bring GPS to the Masses", IEEE Computers Society, May/Jun. 2007, pp. 6-11.

Spohrer. "New Paradigms for Using Computers", 1997; retrieved from the Internet, URL: <http://almaden.ibm.com/npuc97/1997/spohrer.htm>.

Sung et al., "Towards Reliable Peer-to-Peer Data Sharing over Mobile Ad hoc Networks", IEEE, 2005.

Weiss et al., "Zone services—An approach for location-based data collection", Proceedings of the 8th International Conference on E-commerce Technology and the 3rd IEEE International Conference on Enterprise Computing, E-Commerce and E-Services (8 pages), 2006.

Yang et al., "A Mutlimedia System for Route Sharing and Video-based Navigation", IEEE, 2006, pp. 73-76.

Yang et al. "Global Snapshots for Distributed Debugging", IEEE, pp. 436-440, 1992.

Yanyan et al., "The model of optimum route selection in vehicle automatic navigation system based on unblocked reliability analyses", IEEE 2003.

"Cyberguide: a mobile context—aware tour guide", Wireless Networks Archive (Special Issue: Mobile computing and networking; selecting papers from MobiCom '96), 3(5):421-433, 1997.

"Frontiers in electronic media", Interactions Archive 4(4):32-64, 1997.

"Location—aware mobile applications based on directory services", International Conference on Mobile Computing and Networking Archive, Proceedings on the 3rd Annual ACM/IEEE International Conference on Mobile Computing and Networking, Budapest, Hungary, pp. 23-33, 1997.

Sharpe et al., U.S. Appl. No. 12/434,586, filed May 1, 2009.
Sharpe et al., U.S. Appl. No. 12/434,582, filed May 1, 2009.
Van Os et al., U.S. Appl. No. 12/165,413, filed Jun. 30, 2008.
Blumenberg et al., U.S. Appl. No. 12/119,316, filed May 12, 2008.
Low et al., U.S. Appl. No. 12/233,358, filed Sep. 18, 2008.
Sazegari et al., U.S. Appl. No. 12/122,339, filed May 16, 2008.
Johnson, U.S. Appl. No. 12/044,363, filed Mar. 7, 2008.
Johnson, U.S. Appl. No. 11/827,065, filed Jul. 10, 2007.
Herz, U.S. Appl. No. 12/270,814, filed Nov. 13, 2008.

RD 409052, Research Disclosure Alerting Abstract, "Location dependent information for satellite based vehicle communication—required application of Global Position System (GPS) to automatically extract relevant portions of data package as vehicle changes position," May 10, 1998, 1 page.

Dibdin, Peter, "Where are mobile location based services?", Dec. 14, 2001, pp. 1-8.

Cho et al. A Traveler Information Service Structure in Hybrid T-DMB and Cellular Communication Network, Broadcast Systems Research Group, IEEE, (2006), pp. 747-750.

Budka et al., "A Bayesian method to Improve Mobile Geolocation Accuracy", IEEE, 2002, pp. 1021-1025.

Yamamoto et al., "Position Location Technologies Using Signal Strength in Cellular Systems", IEEE, 2001, pp. 2570-2575.

International Search Report and Written Opinion, dated Oct. 1, 2009, issued in PCT/US2009/041298.

Drane et al., "The accurate location of mobile telephones", Third Annual World Congress on Intelligent Transport Systems, Orlando, Florida, Oct. 1996.

"Travel Time Data Collection Handbook—Chapter 5: Its Probe Vehicle Techniques", FHWA-PL-98-035 Report, Department of Transport, University of Texas, Mar. 1998; [online] [Retrieved from the Internet at http://www.fhwa.dot.gov/ohim/handbook/chap5.pdf.

Ygnace et al., "Travel Time Estimation on the San Francisco Bay Area Network Using Cellular Phones as Probes", Working Paper, Institute of Transportation Studies, University of California, Berkeley, 2000.

Wang et al., "A Unified Vehicle Supervising and Traffic Information System", IEEE, 1996, pp. 968-972.

US 6,731,928, 11/2004, Tanaka (withdrawn).

Dey, "Context-Aware Computing: The CyberDesk Project," [online] Retrieved from the Internet: URL: http://www.cc.gatech.edu/fce/cyberdesk/pubs/AAAI98/AAAI98.html; AAAI '98 Spring Symposium, Stanford University, Mar. 23-25, 1998, downloaded from the Internet on Aug. 6, 2010, 8 pages.

Challe, "CARMINAT-An Integrated information and guidance system," Vehicle Navigation and Information Systems Conference, Oct. 20-23, 1991, Renault—Direction de la Recherche, Rueil-Malmaison, France.

Pungel, "Traffic control—beat the jam electronically," Funkschau, 1988, 18:43-45 (w/English translation).

Rillings and Betsold, "Advanced driver information systems," Vehicular Technology, IEEE Vehicular Technology Society, 1991, 40:31-40.

Tsuzawa and Okamoto, "Advanced Mobile Traffic Information and Communication System," First Vehicle Navigation and Information Systems Conference, Sep. 11-13, 1989, Toronto, Canada, Abstract only.

Wong, "GPS: making roads safer and solving traffic tangles," Asia Engineer, 1995, 23(9):31-32.

Ayatsuka et al., "UbiquitousLinks: Hypermedia Links Embedded in the Real World, Technical Report of Information Processing Society, 96-HI-67," Information Processing Society of Japan, Jul. 11, 1996, 96(62):23-30.

Nagao et al., Walk Navi: A Location-Aware Interactive Navigation/Guideline System and Software III, First edition, pp. 9-48, published by Kindai-Kagaku-Sya Co. Ltd., Dec. 10, 1995.

Benefon ESC! GSM+GPS Personal Navigation Phone, benefon.com, Copyright 2001, 4 pages.

Freundschuh, "Does 'Anybody' Really Want (or Need) Vehicle Navigation Aids?" First Vehicle Navigation and Information System Conference, Sep. 11-13, 1989, Toronto, Canada, 5 pages.

Gould, "The Provision of Usable Navigation Assistance: Considering Individual Cognitive Ability," First Vehicle Navigation and Information System Conference, Sep. 11-13, 1989, Toronto, Canada, 7 pages.

Mark, "A Conceptual Model for Vehicle Navigation Systems," First Vehicle Navigation and Information System Conference, Sep. 11-13, 1989, Toronto, Canada, 11 pages.

Wheeler et al., "Development of Human Factors Guidelines for Advanced Traveler Information Systems and Commercial Vehicle Operations: Task Analysis of ATIS/CVO Functions," US Dept. Transportation Federal Highway Administration Research and Development, Publication No. FHWA-RD-95-176, Nov. 1996, 124 pages.

Miller et al., "Integrating Hierarchical Navigation and Querying: A User Customizable Solution," ACM Multimedia Workshop on Effective Abstractions in Multimedia Layout, Presentation, and Interaction, San Francisco, CA, Nov. 1995, 8 pages.

Hoogenraad, "Location Dependent Services," 3rd AGILE Conference on Geographic Information Science, Helsinki/Espoo, Finland, May 25-27, 2000, pp. 74-77.

Bonsignore, "A Comparative Evaluation of the Benefits of Advanced Traveler Information System (ATIS) Operational Tests," MIT Masters Thesis, Feb. 1994, 140 pages.

Noonan and Shearer, "Intelligent Transportation Systems Field Operational Test Cross-Cutting Study Advance Traveler Information systems," Intelligent Transportation Systems Field Operational Test Cross-Cutting Study, Sep. 1998, 26 pages.

Burnett, "Usable Vehicle Navigation Systems: Are We There Yet?" Vehicle Electronic Systems 2000, Jun. 29-30, 2000, 3.1.1-3.1.12.

Khattak et al., "Bay Area ATIS Testbed Plan," Research Reports, California Partners for Advanced Transit and Highways (PATH), Institute of Transportation Studies, UC Berkeley, Jan. 1, 1992, 83 pages.

Yim et al., "Travinfo Field Operational Test: Work Plan for the Target, Network, and Value Added Reseller (VAR) Customer Studies," Working Papers, California Partners for Advanced Transit and Highways (PATH), Institute of Transportation Studies, UC Berkeley, Apr. 1, 1997, 49 pages.

Mahmassani et al., "Providing Advanced and Real-Time Travel/Traffic Information to Tourists," Center for Transportation Research, Bureau of Engineering Research, The University of Texas at Austin, Oct. 1998, 15 pages.

"New Handsets Strut Their Stuff At Wireless '99," Internet: URL: http://findarticles.com/p/articles/mi_m0BMD/is_1999_Feb_11/ai_n27547656/ downloaded from Internet on Feb. 11, 1999, 3 pages.

"School Buses to Carry Noticom's First Application," Internet: URL: http://findarticles.com/p/articles/mi_m0BMD/is_1999_Feb_17/ai_n27547754/ downloaded from the Internet on Feb. 17, 1999, 2 pages.

Green et al., "Suggested Human Factors Design Guidelines for Driver Information Systems," Technical Report UMTRI-93-21, Nov. 1993, 119 pages.

Tijerina et al., "Driver Workload Assessment of Route Guidance System Destination Entry While Driving: A Test Track Study," Proceedings of the 5th ITS World Congress, Oct. 12-16, 1998, Seoul, Korea, 9 pages.

Muraskin, "Two-Minute Warnings for School Bus Riders," Internet: URL: http://www.callcentermagazine.com/shared/printableArticle.jhtml;jsessionid=PQH1SZXW . . . Jul. 1, 1999, 3 pages.

Ni and Deakin, "On-Board Advanced Traveler Information Systems," Dec. 1, 2002, 10 pages.

Serafin et al., "Functions and Features of Future Driver Information Systems," Technical Report UMTRI-91-16, May 1991, 104 pages.

Shekhar and Liu, "Genesis and Advanced Traveler Information Systems (ATIS): Killer Applications for Mobile Computing?" NSF Mobidata Workshop on Mobile and Wireless Information Systems, Nov. 1994, 20 pages.

"LaBarge in joint venture on bus system," Internet: URL: http://www.bizjournals.com/stlouis/stories/1998/08/10/focus2.html?t-printable, Aug. 7, 1998, 1 page.

Clarke et al., "Development of Human Factors Guidelines for Advanced Traveler Information Systems (ATIS) and Commercial Vehicle Operations (CVO): Comparable Systems Analysis," U.S. Department of Transportation Federal Highway Administration, Publication No. FHWA-RD-95-197, Dec. 1996, 212 pages.

Zubac and Strahonja, "Theory and Development of an Online Navigation System," 18th International Conference on Information and Intelligent Systems, University of Zagreb, Sep. 12-14, 2007.

Brown, "The stick-e document: a framework for creating context-aware applications," Electronic Publishing, 1995, 8:259-272.

Brown, "Triggering Information by Context," Personal Technologies, 1998, 2:18-27.

Dey et al., "CyberDesk: a framework for providing self-integrating context-aware services," Knowledge-Based Systems, 1998, 11:3-13.

Hodes and Katz, "Composable ad hoc location-based services for heterogeneous mobile clients," Wireless Networks, 1999, 5:411-427.

Kreller et al., "A Mobile-Aware City Guide Application," ACTS Mobile Communication Summit, 1998, Rhodes, Greece, 7 pages.

Lusky et al., "Mapping the Present," ColoradoBiz, Nov. 1999, 26(11):16-17.

McCarthy and Meidel, "Activemap: A Visualization Tool for Location Awareness to Support Informal Interactions," HUC '99, LNCS 1707, 1999, pp. 158-170.

O'Grady et al., "A Tourist-Centric Mechanism for Interacting with the Environment," Proceedings of the First International Workshop on Managing Interactions in Smart Environments (MANSE '99), Dublin, Ireland, Dec. 1999, pp. 56-67.

Pascoe et al., "Developing Personal Technology for the Field," Personal Technologies, 1998, 2:28-36.

Tarumi et al., "Public Applications of SpaceTag and Their Impacts," Digital Cities, LNCS 1765, 2000, pp. 350-363.

Tebbutt, "Dial your way out of the woods," The Australian, Feb. 2000, 1 page.

Tso et al., "Always on, Always Connected Mobile Computing," Mobile Communications Operation—Mobile Handheld Products Group, 1996, pp. 918-924.

Wang and Lin, "Location Aware Information Agent over WAP," Tamkang Journal of Science and Engineering, 2000, 3(2):107-115.

"3rd Generation Partnership Project (3GPP); Technical Specification Group (TSG) RAN; Working Group 2 (WG2); Report on Location Services (LCS),"3G TR 25.923 v.1.0.0, Apr. 1999, 45 pages.

"Report on Location Service feature (LCS) 25.923 v1.0.0," TSG-RAN Working Group 2 (Radio layer 2 and Radio layer 3), Berlin, May 25-28, 1999, 45 pages.

"3rd Generation Partnership Project; Technical Specification Group Services and System Aspects; Functional stage 2 description of location services in UMTS," 3G TS 23.171 v.1.1.0, Nov. 1999, 42 pages.

"3rd Generation Partnership Project; Technical Specification Group Radio Access Network; Stage 2 Functional Specification of Location Services in UTRAN," 3G TS 25.305 v.3.1.0, Mar. 2000, 45 pages.

"Enabling UMTS / Third Generation Services and Applications," No. 11 Report from the UMTS Forum, Oct. 2000, 72 pages.

"3rd Generation Partnership Project (3GPP); Technical Specification Group (TSG) RAN; Working Group 2 (WG2); Report on Location Services," TS RAN R2.03 V0.1.0, Apr. 1999, 43 pages.

"Revised CR to 09/31 on work item LCS," ETSI SMG3 Plenary Meeting #6, Nice, France, Dec. 13-15, 1999. 18 pages.

Digital cellular telecommunications system (Phase 2+); Location Services (LCS); Service description, Stage 1 (GSM 02.71) ETSI, Apr. 1999, 22 pages.

Akerblom, "Tracking Mobile Phones in Urban Areas," Goteborg University Thesis, Sep. 2000, 67 pages.

Borsodi, "Super Resolution of Discrete Arrivals in a Cellular Geolocation System," University of Calgary Thesis, Apr. 2000, 164 pages.

Abowd et al., "Context-awareness in wearable and ubiquitous computing," 1st International Symposium on Wearable Computers, Oct. 13-14, 1997, Cambridge, MA, 9 pages.

Balsiger et al., "MOGID: Mobile Geo-depended Information on Demand," Workshop on Position Dependent Information Services (W3C-WAP), 2000, 8 pages.

Cheverst et al., "Architectural Ideas for the Support of Adaptive Context-Aware Applications," Proceedings of Workshop on Infrastructure for Smart Devices—How to Make Ubiquity an Actuality, HUC'00, Bristol, Sep. 2000, 3 pages.

Cheverst et al., "The Role of Connectivity in Supporting Context—Sensitive Applications," HUC'99, LNCS 1707, 1999, pp. 193-209.

Efstratiou and Cheverst, "Reflection: A Solution for Highly Adaptive Mobile Systems," 2000 Workshop on Reflective Middleware, 2000, 2 pages.

Cheverst et al., "The Support of Mobile—Awareness in Collaborative Groupware," Personal Technologies, 1999, 3:33-42.

Cheverst et al., "Design of an Object Model for a Context Sensitive Tourist Guide," Computers and Graphics, 1999, 23(6):883-891.

Cheverst et al., "Developing Interfaces for Collaborative Mobile Systems," 1999, 15 pages.

Cheverst et al., "Experiences of Developing and Deploying a Context—Aware Tourist Guide: The GUIDE Project," 2000, pp. 20-31.

Cheverst et al., "Exploiting Context to Support Social Awareness and Social Navigation," SIGGROUP Bulleting Dec. 2000, 21(3):43-48.

Cheverst et al., "Services to Support Consistency in Mobile Collaborative Applications," Proc. 3rd International Workshop on Services in Distributed Networked Environments, 1996, 8 pages.

Cheverst et al., "Sharing (Location) Context to Facilitate Collaboration Between City Visitors," 2000, 8 pages.

Cheverst et al., "Supporting Collaboration in Mobile-aware Groupware," Workshop on Handheld CSCW, 1998, 6 pages.

Change Request for "U.S. specific Emergency Services requirements included as an informative annex," Nov. 29, 1999, 2 pages.

Costa et al., "Experiments with Reflective Middleware," Proceedings of the ECOOP'98 Workshop on Reflective Object-Oriented Programming and Systems, ECOOP'98 Workshop Reader, 1998, 13 pages.

Davies et al., "L2imbo: A distributed systems platform for mobile computing," Mobile Networks and Applications, 1998, 3:143-156.

Davies et al., "'Caches in the Air': Disseminating Tourist Information in the Guide System," Second IEEE Workshop on Mobile Computer Systems and Applications, Feb. 25-26, 1999, 9 pages.

Dix et al., "Exploiting Space and Location as a Design Framework for Interactive Mobile Systems," ACM Transactions on Computer-Human Interaction (TOCHI)—Special issue on human—computer interaction with mobile systems, 2000, 7(3):285-321.

Drane et al., "Positioning GSM Telephones," IEEE Communications Magazine, Apr. 1998, pp. 46-59.

Drane and Rizos, "Role of Positioning Systems in ITS," Positioning Systems in Intelligent Transportation Systems, Dec. 1997, pp. 312, 346-349.

Efstratiou et al., "Architectural Requirements for the Effective Support of Adaptive Mobile Applications," 2000, 12 pages.

"Estonian operator to launch world's first Network—based location services," Ericsson Press Release, Oct. 11, 1999, 2 pages.

Fischer et al., "System Performance Evaluation of Mobile Positioning Methods," IEEE, Aug. 2002, pp. 1962-1966.

Flinn and Satyanarayanan, "PowerScope: A Tool for Profiling the Energy Usage of Mobile Applications," Proc. WMCSA '99 Second IEEE Workshop on Mobile Computing Systems and Applications, Feb. 25-26, 1999, 9 pages.

French and Driscoll, "Location Technologies for ITS Emergency Notification and E911," Proc. 1996 National Technical Meeting of the Institute of Navigation, Jan. 22-24, 1996, pp. 355-359.

Friday et al., "Developing Adaptive Applications: The MOST Experience," J. Integrated Computer-Aided Engineering, 1999, pp. 143-157.

Gunnarsson et al., "Location Trial System for Mobile Phones," IEEE, 1998, pp. 2211-2216.

Jose and Davies, "Scalable and Flexible Location—Based Services for Ubiquitous Information Access," HUC'99, LNCS 1707, 1999, pp. 52-66.

Klinec and Nolz, "Nexus—Positioning and Communication Environment for Spatially Aware Applications," IAPRS, Amsterdam, 2000, 7 pages.

Kovacs et al., "Adaptive Mobile Access to Context—aware Services," Proc. ASAMA '99 Proc. First International Symposium on Agent Systems and Applications Third International Symposium on Mobile Agents, IEEE Computer Society Washington, DC, 1999, 12 pages.

Kreller et al., "UMTS: A Middleware Architecture and Mobile API/Approach," IEEE Personal Communications, Apr. 1998, pp. 32-38.

Kugler and Lechner, "Combined Use of GPS and LORAN-C in Integrated Navigation Systems," Fifth International Conference on Satellite Systems for Mobile Communications and Navigation, London, UK, May 13-15, 1996, pp. 199-207.

Kyriazakos et al., "Optimization of the Handover Algorithm based on the Position of the Mobile Terminals," Communications and Vehicular Technology, Oct. 2000, pp. 155-159.

Leonhardt and Magee, "Towards a general location service for mobile environments," Proc. Third International Workshop on Services in Distributed and Networked Environments, Jun. 3-4, 1996, 8 pages.

Long et al., "Rapid Prototyping of Mobile Context—Aware Applications: The Cyberguide Case Study," MobiCom '96, 1996, 11 pages.

Popescu-Zeletin et al., "Applying Location—Aware Computing for Electronic Commerce: Mobile Guide," Proc. 5th Conference on Computer Communications, AFRICOM-CCDC'98,Oct. 20-22, 1998, 14 pages.

Zhao, "Mobile Phone Location Determination and Its Impact on Intelligent Transportation Systems," IEEE Transactions on Intelligent Transportation Systems, Mar. 2000, 1(1):55-64.

Microsoft Outlook 2003 User's Guide, http://opan.admin.ufl.edu/user_guides/outlook2003.htm. Aug. 2004, 17 pages.

"Error: could not find a contact with this e-mail address." Outlookbanter.com. Dec. 2006, 12 pages.

Authorized officer Dorothee Mulhausen, International Preliminary Report on Patentability in PCT/US2009/41298 mailed Nov. 25, 2010, 8 pages.

* cited by examiner

LOCATION-BASED CATEGORICAL INFORMATION SERVICES

CROSS-REFERENCE TO RELATED APPLICATION

This application claims priority to U.S. Provisional Patent Application Ser. No. 60/946,825 filed Jun. 28, 2007, and entitled "LOCATION-BASED CATEGORICAL INFORMATION SERVICES," the contents of which are incorporated herein by reference.

TECHNICAL FIELD

The subject matter of this patent application is generally related to mobile devices.

BACKGROUND

Mobile devices have grown more powerful and feature-rich and now include such features as personal digital assistant (PDA) capabilities, cameras to capture video and still images, Internet access, etc. Location-based services have been developed for determining and tracking the locations of the users of mobile devices. Location-based services provide location-specific information to mobile devices, including for example, global positioning system (GPS) data to locate the mobile device on a map of a geographic region.

Some examples of location-based information include listings of events and sites of interest. A user wishing to gain this information can search the Internet, visit the local tourism office, or consult a travel guide or a local newspaper. However, these approaches require the user to actively search a resource, can be time-consuming, can provide outdated information, and can produce a large amount of information that may be of little interest to the user.

SUMMARY

Location-based information services can be provided to a user through a mobile device by providing categorical information from a network resource. The categorical information can be provided based on user preferences and/or a geographic location of the mobile device. Additionally, the user can provide location-based information to a network-based repository and/or service, where the user-provided information can be used to enrich information provided to other users.

In some implementations, a method includes: receiving first information associated with a category of interest from a mobile device; receiving second information identifying a geographic location of the mobile device; determining categorical information using the first information and the second information; and providing the categorical information to the mobile device as a data structure containing information used by the mobile device to represent the categorical information on a map by a graphical object.

In some implementations, a system includes a positioning system operable to obtain a current location of a mobile device, a data structure including a set of categorical information, and a map application operable to provide a display of a map. In some implementations, the map can include a graphical representation of an item in the set of categorical information, where the graphical representation can be displayed at a location corresponding to an address of the item.

In some implementations, a method includes: providing first information associated with a category of interest; providing second information associated with a location of a mobile device; receiving categorical information using the first information and the second information; receiving categorical information determined based on the first information and the second information; and displaying a map including graphical representations of one or more items in the categorical information, where the graphical representations are displayed at locations corresponding to addresses of the one or more items, and wherein the graphical representations are displayed based on a zoom level of the map.

Other implementations are disclosed, including implementations directed to systems, methods, apparatuses, computer-readable mediums and user interfaces.

DETAILED DESCRIPTION

Figure 1:
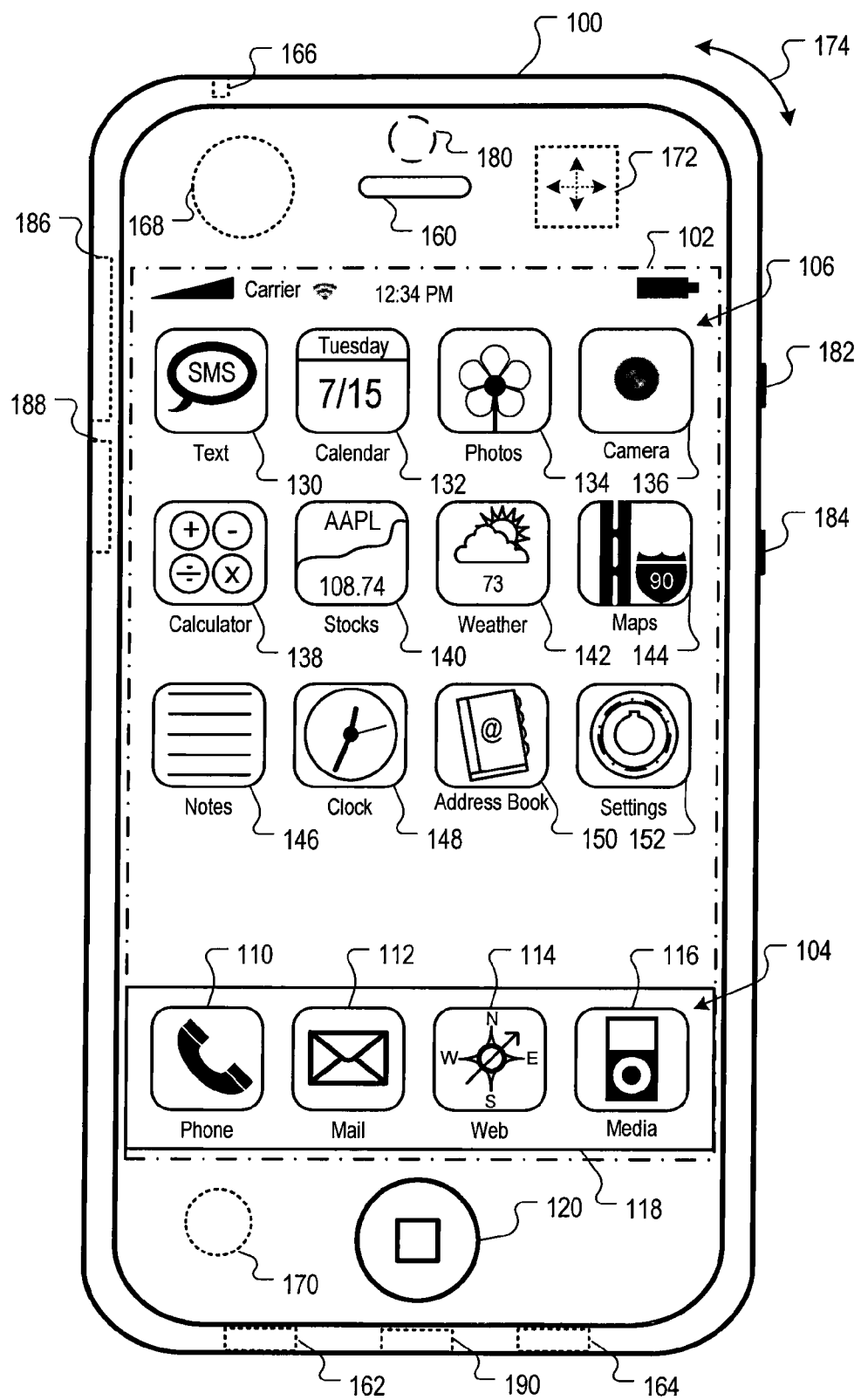
FIG. 1 is a block diagram of an example mobile device.

FIG. 1 is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or other electronic device, a combination of any two or more of these data processing devices or other data processing devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and U.S. Patent Publication 2002/0015024A1, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Exemplary Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; a Wi-Fi base station device (not shown); and a media processing device, as indicated by the media player object 116. In some implementations, particular display objects 104, e.g., the phone object 110, the e-mail object 112, the Web object 114, and the media player object 116, can be displayed in a menu bar 118. In some implementations, device functionalities can be accessed from a top-level graphical user interface, such as the graphical user interface illustrated in FIG. 1. Touching one of the objects 110, 112, 114 or 116 can, for example, invoke corresponding functionality.

In some implementations, the mobile device 100 can implement network distribution functionality. For example, the functionality can enable the user to take the mobile device 100 and its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1 can be restored by pressing a button 120 located near the bottom of the mobile device 100. In some implementations, each corresponding device functionality may have corresponding "home" display objects displayed on the touch-sensitive display 102, and the graphical user interface environment of FIG. 1 can be restored by pressing the "home" display object.

In some implementations, the top-level graphical user interface can include additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, and a settings object 152. Touching the SMS display object 130 can, for example, invoke an SMS messaging environment and supporting functionality; likewise, each selection of a display object 132, 134, 136, 138, 140, 142, 144, 146, 148, 150 and 152 can invoke a corresponding object environment and functionality.

Additional and/or different display objects can also be displayed in the graphical user interface of FIG. 1. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol. In some implementations, a TCP/IP over USB protocol can be used.

Network Operating Environment

Figure 2:
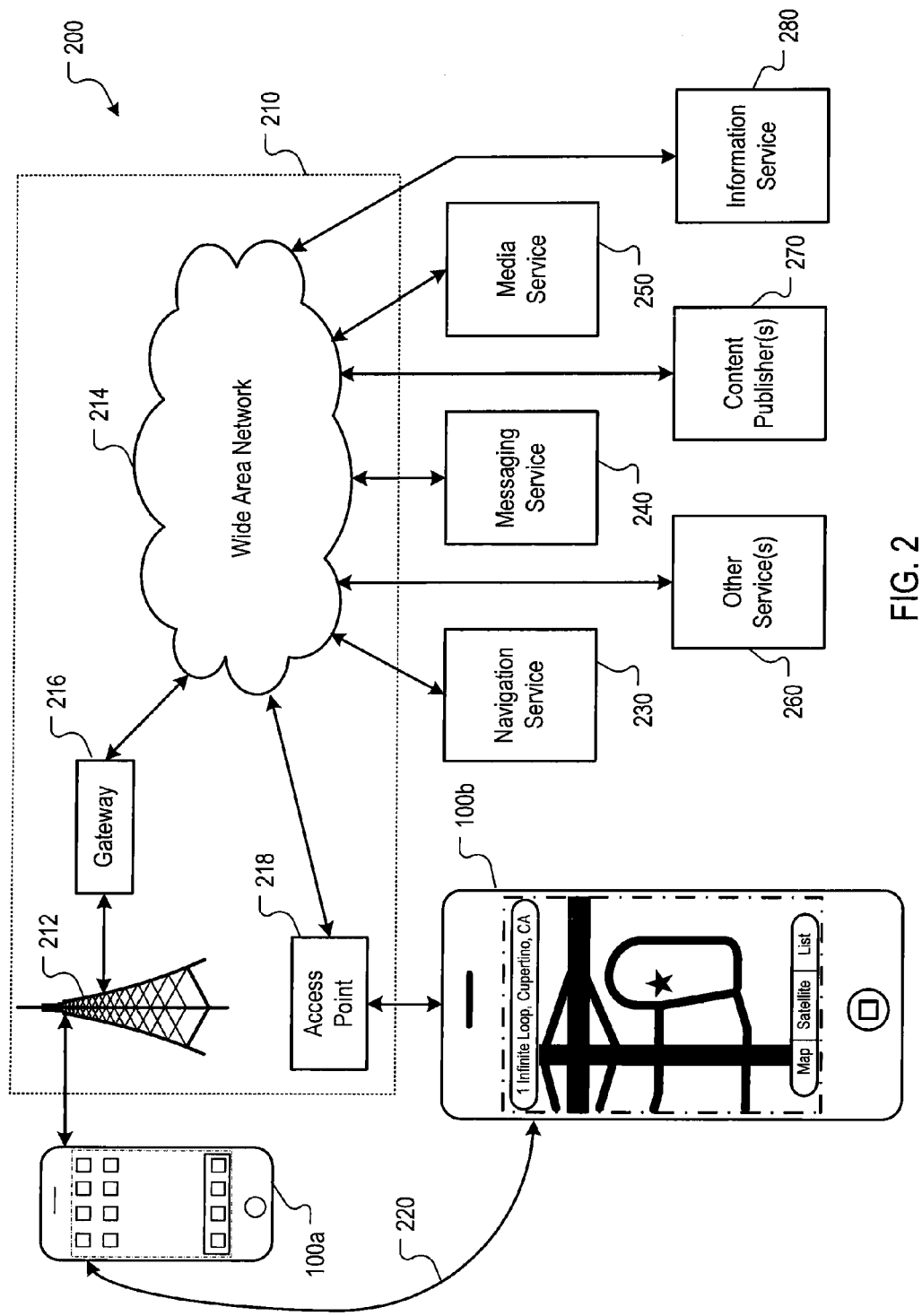
FIG. 2 is a block diagram of an example network operating environment for the mobile device of FIG. 1.

FIG. 2 is a block diagram of an example network operating environment 200 for the mobile device 100 of FIG. 1. The mobile device 100 of FIG. 1 can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access point 218, such as an 802.11g wireless access point, can provide communication access to the wide area network 214. In some implementations, both voice and data communications can be established over the wireless network 212 and the access point 218. For example, the mobile device 100a can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., using TCP/IP or UDP protocols). Likewise, the mobile device 100b can place and receive phone calls, send and receive e-mail messages, and retrieve electronic documents over the access point 218 and the wide area network 214. In some implementations, the mobile device 100 can be physically connected to the access point 218 using one or more cables and the access point 218 can be a personal computer. In this configuration, the mobile device 100 can be referred to as a "tethered" device.

The mobile devices 100a and 100b can also establish communications by other means. For example, the wireless device 100a can communicate with other wireless devices, e.g., other wireless devices 100, cell phones, etc., over the wireless network 212. Likewise, the mobile devices 100a and 100b can establish peer-to-peer communications 220, e.g., a personal area network, by use of one or more communication subsystems, such as the Bluetooth™ communication device 188 shown in FIG. 1. Other communication protocols and topologies can also be implemented.

The mobile device 100 can, for example, communicate with one or more services 230, 240, 250, 260 and 280 and/or one or more content publishers 270 over the one or more wired and/or wireless networks 210. For example, a navigation service 230 can provide navigation information, e.g., map information, location information, route information, and other information, to the mobile device 100. In the example shown, a user of the mobile device 100b has invoked a map functionality, e.g., by pressing the maps object 144 on the top-level graphical user interface shown in FIG. 1, and has requested and received a map for the location "1 Infinite Loop, Cupertino, Calif."

A messaging service 240 can, for example, provide e-mail and/or other messaging services. A media service 250 can, for example, provide access to media files, such as song files, movie files, video clips, and other media data. One or more other services 260 can also be utilized by the mobile device 100.

The mobile device 100 can also access other data and content over the one or more wired and/or wireless networks 210. For example, content publishers, e.g., content publisher(s) 270, such as news sites, RSS feeds, web sites, blogs, social networking sites, developer networks, etc., can be accessed by the mobile device 100. Such access can be provided by invocation of a web browsing function or application (e.g., a browser) in response to a user touching the Web object 114.

An information service 280 can include multiple content repositories populated with data regarding items of interest that are categorized. The information service block 280 can receive preferences and location information to generate categorical information as output. In some implementations, the information service block 280 is a network resource which can be accessed through a network connection (e.g., the Internet, wireless network).

Exemplary Mobile Device Architecture

Figure 3:
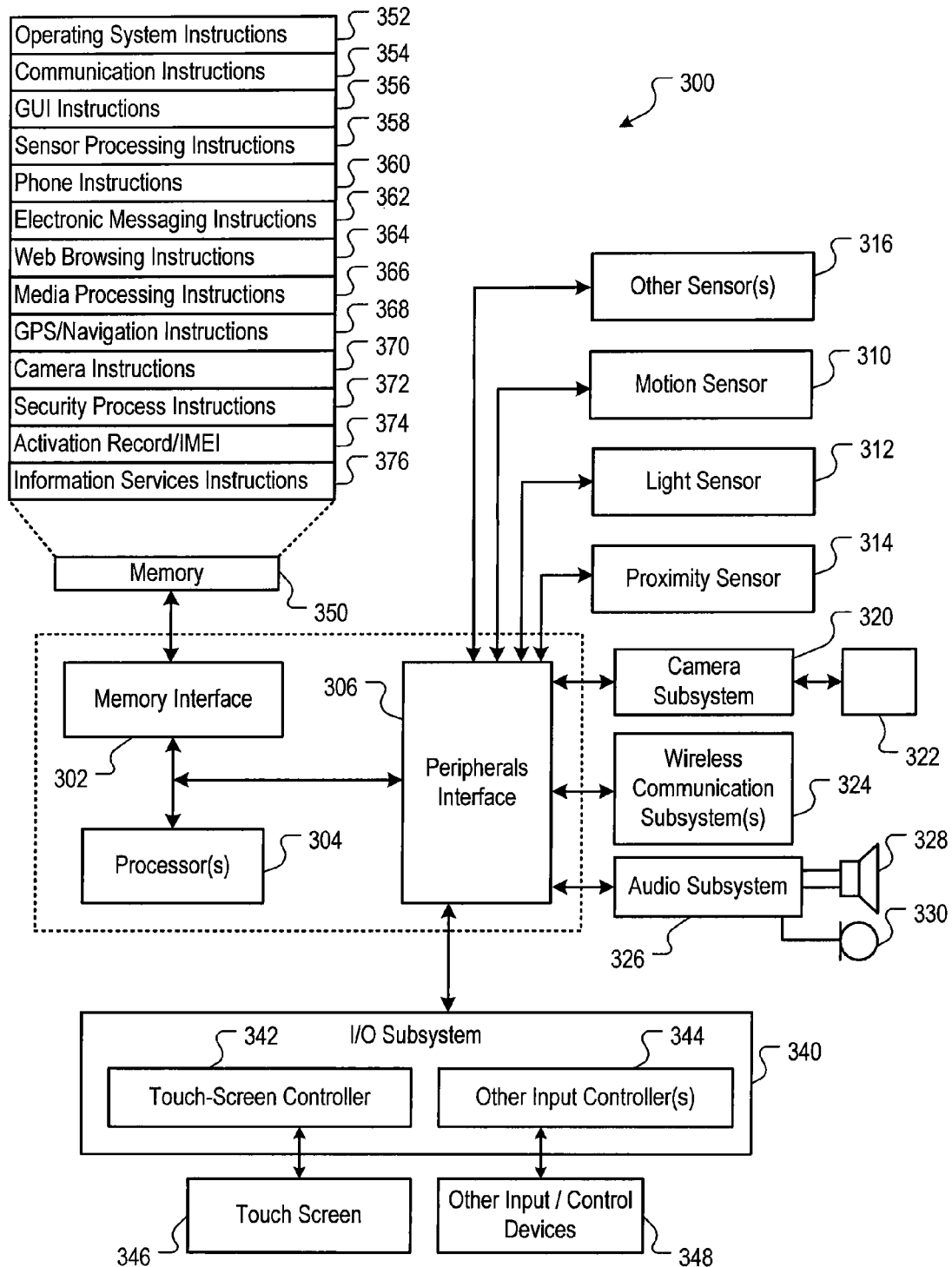
FIG. 3 is a block diagram of an example implementation of the mobile device of FIG. 1.

FIG. 3 is a block diagram 300 of an example implementation of the mobile device 100 of FIG. 1. The mobile device 100 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 100 can be coupled by one or more communication buses or signal lines.

Sensors, devices and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting and proximity functions described with respect to FIG. 1. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device 100 is intended to operate. For example, a mobile device 100 may include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the device 100 may be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device 100 on or off. The user may be able to customize a functionality of one or more of the buttons. The touch screen 346 can, for example, also be used to implement virtual or soft buttons and/or a keyboard.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 36-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel).

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; security process instructions 372, activation record/IMEI 374, and information services instructions 376.

Each of the above identified instructions and applications can correspond to a set of instructions for performing one or more functions described above. These instructions need not be implemented as separate software programs, procedures or modules. The memory 350 can include additional instructions or fewer instructions. Furthermore, various functions of the mobile device 100 may be implemented in hardware and/or in software, including in one or more signal processing and/or application specific integrated circuits.

Exemplary Information Service Block Architecture

Figure 4:
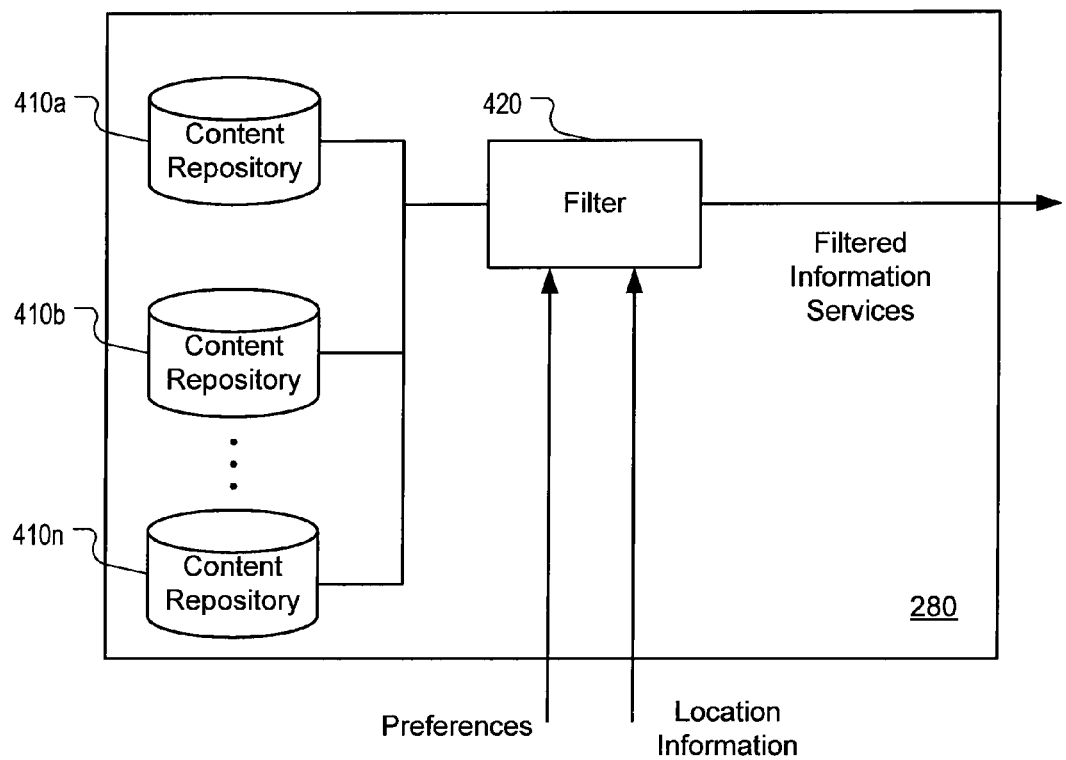
FIG. 4 is a block diagram of an example implementation of the information service block of FIG. 2.

FIG. 4 is a block diagram of an example implementation of the information service block 280 of FIG. 2. The information service block 280 includes multiple content repositories 410a, 410b . . . 410n and a filter 420. The information service block 280 can receive preferences and location information as input, and generates filtered information services as output. In some implementations, the information service block 280 is a network resource which can be accessed through a network connection (e.g., the Internet, wireless network).

The content repositories 410 or content databases store location-based information. Some examples of location-based content items include information about points of interest (e.g., museums, zoos, historical sites, famous homes), shopping (e.g., specialty stores, jewelry, music stores, antiques), and information about local activities (e.g., hiking, skydiving, birdwatching). In some implementations, the location-based information can be indexed (e.g., an inverse index) in the content repositories 410 by geographic location or region, such as, for example, by metropolitan region, county, town, zip code, or telephone area code.

The information service block 280 can receive from the mobile device 100, through the wired and/or wireless networks 210, preferences and location information, e.g., user preferences and user geographic location information. The geographic location information can be provided by the mobile device 100 using GPS or other positioning systems (e.g., systems using Wi-Fi access points, television signals, cellular grids, or URLs). The geographic location information can be received, for example, as latitudinal and longitudinal coordinates, as a region associated with a Wi-Fi access point, or as a metropolitan region, a county, or a town. In some implementations, the mobile device 100 pushes geographic location information to the information service block 280 through the wired and/or wireless networks 210.

In some implementations, user preferences can define the types of location-based information the user of the mobile device 100 wishes to receive. For example, the user can choose to receive certain categories of information. Setting preferences for information services is described in more detail with reference to FIGS. 5A-5B. In some implementations, if the user preferences have not been set, the information service block 280 can use default settings for the mobile device 100.

The filter 420 of the information service block 280 can receive as an input user preferences, location information, and/or location-based information from the content repositories 410. In some implementations, the filter 420 also receives location-based information from content repositories or servers remote to the information service block 280. The output of the filter 420 and the information service block 280 is categorical information that conforms to the input preferences and that can be location-specific, based on the input location information. In some implementations, the location-based information is stored on the mobile device 100, and filtering of the location-based information is performed by the mobile device 100.

Exemplary Preference Setting for Location-Based Information Services

Figure 5A:
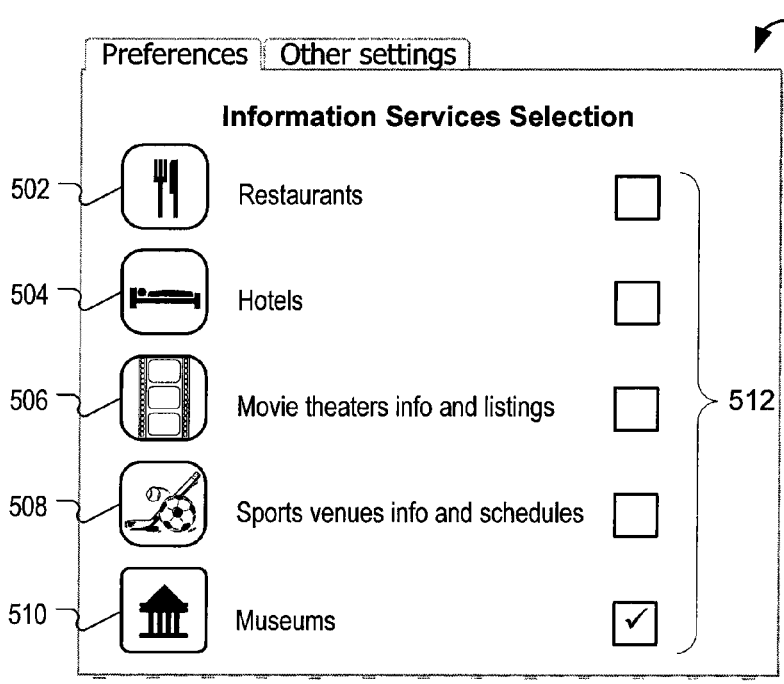
FIG. 5A illustrates an example of selecting categorical information for location-based information services.

FIG. 5A illustrates an example 500 of selecting categorical information and setting preferences for location-based information services provided by the mobile device 100 of FIG. 1. The example 500 uses a graphical user interface with a tabbed window which can be displayed in, for example, the touch-sensitive display 102 of the mobile device 100, or in a display of an access device 218 (e.g., a personal computer) when the mobile device 100 is in communication with the access device 218. For example, a mobile service application of the access device 218 can allow a user to set preferences for the location-based information services.

In this example, a user of the mobile device 100 can choose to receive categorical information corresponding to restaurants 502, hotels 504, movie theaters information and listings 506, sports venues information and schedules 508, and museums 508. The user can select the types of categorical information to be retrieved by checking the corresponding checkbox 512 for the desired topic. In the example 500, the user has set the preferences for the location-based information services by choosing to receive categorical information related only to museums 508. In some implementations, more than one category can be selected or a new category can be input by the user using, e.g., the touch-sensitive display 102 of the mobile device 100. In some implementations, one or more of the categories shown in FIG. 5A can have subcategories that can be selected to further refine the information to be provided to the mobile device. The subcategories can be accessed through menus or other control structures.

In some implementations, the user sets the preferences at the time the mobile device 100 is configured or activated. The user can modify the preference settings at a later date. In some implementations, the first time a user requests location-based information services (e.g., by selecting the information services object 122 of FIG. 1), the user is presented with the information services selection interface, such as the tabbed window in example 500.

Figure 5B:
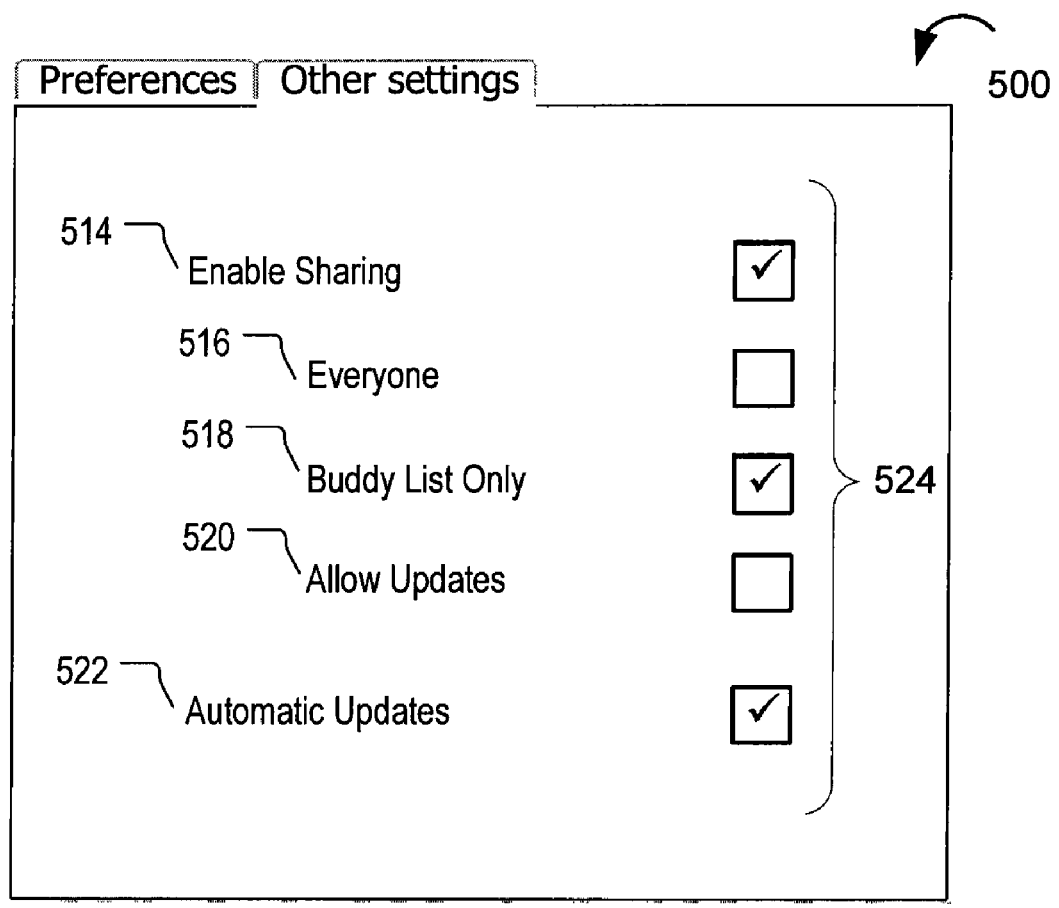
FIG. 5B illustrates an example of settings for categorical information provided to the mobile device.

FIG. 5B illustrates an example 530 of other settings for categorical information provided to the mobile device 100. In an implementation, a user can share categorical information with others. In the example 500, a user can enable sharing 514 and define how the categorical information is to be shared using checkboxes 524 (e.g., with everyone 516 or only with contacts on a "buddy list" 518). In another implementation, a user can set a preference to enable others to update the categorical information. In the example 500, a checkbox 524 is provided to allow updates 520 by others (i.e., everyone 516 or only buddy list contacts 518, as specified by a user).

In an implementation, automatic updates 522 to the categorical information can be provided to the mobile device 100. For example, if a user selects museums 508, and a new museum opens or updates its content, the categorical information provided to the mobile device 100 can be updated automatically to reflect the updated information.

Figure 6A:
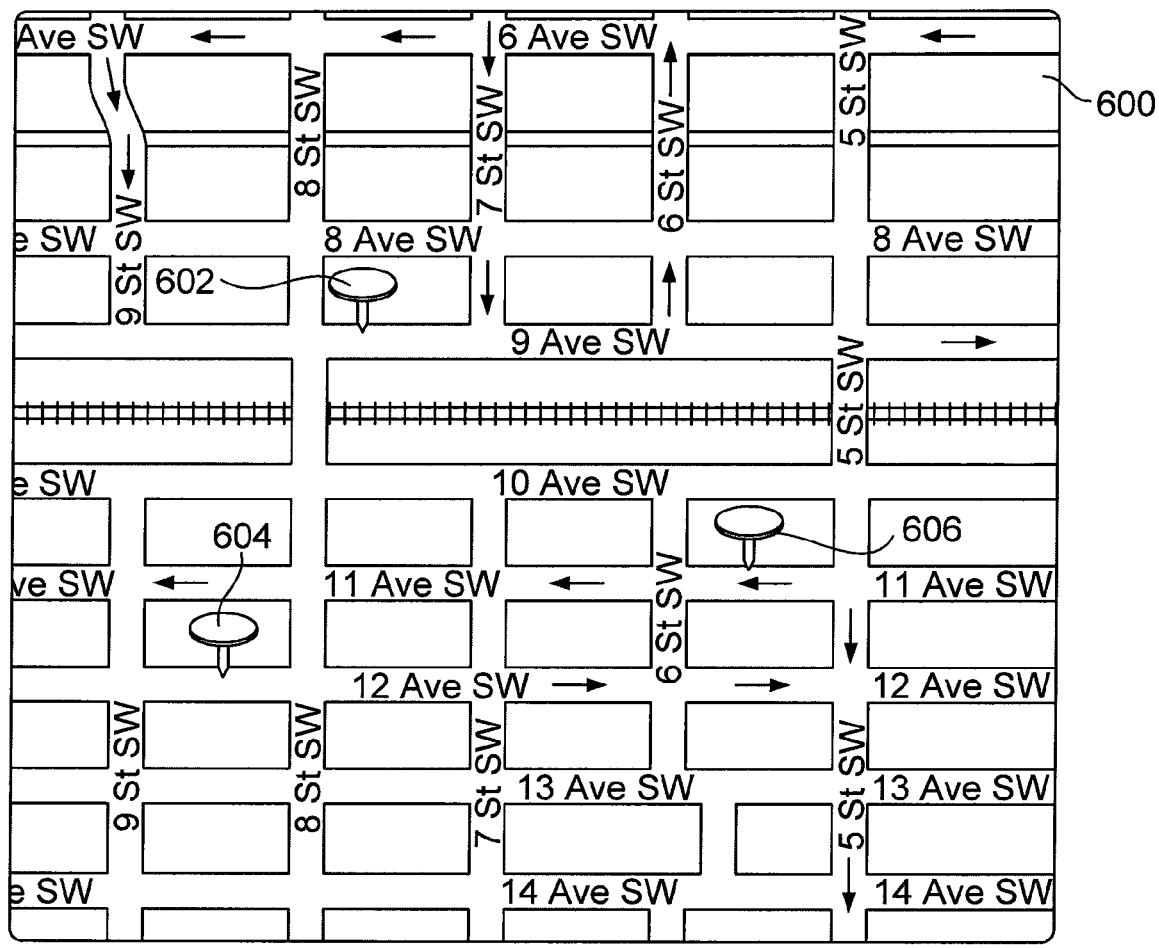
FIGS. 6A and 6B illustrate an example of a user interface that displays locations of items that satisfy a request for categorical information.
Figure 6B:
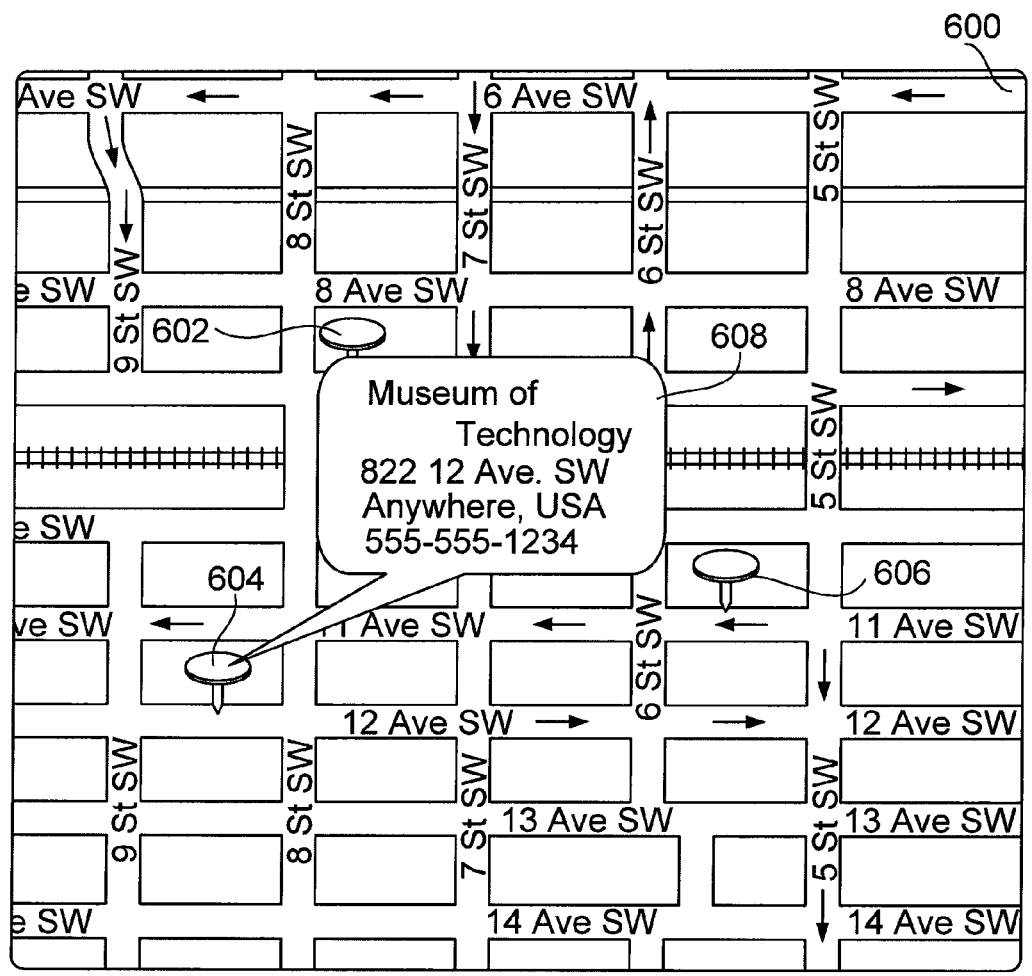

Referring now to FIGS. 6A-B, an example of user interface 600 that displays graphical objects 602, 604 and 606 representing the locations of items of interest that satisfy a request for categorical information (e.g. museums). In an implementation, the graphical objects 602, 604 and 606 appear as push pins that are "pinned" to a map at their corresponding locations. In one implementation, the user can define a setting within the mobile device 100 to specify a proximity condition that must be satisfied by an item before a push pin is shown on the map representing an item that satisfies a condition. In an example, the proximity condition can specify that the item's location be within a certain radius of the current location of the mobile device 100 in order to be displayed on the map 600. In some implementations, the categorical information can be manually updated in response to a user selection of an update option.

In yet another example, the proximity condition can specify that the item's location be within the geographic parameters of the map displayed to the user in order to be displayed on the map 600. In such an example, if the user selects to "zoom out" the map to display a larger geographical area, then multiple other push pins may appear corresponding to locations within the larger geographical area. In another implementation, the proximity condition can specify that the graphical objects are displayed and/or removed from the map 600 as the displayed map 600 changes to indicate movement of the mobile device 100.

As mentioned above, each push pin 602, 604 and 606 represents an item that satisfies a condition (e.g., a request for categorical information). If the user desires to retrieve information about a particular item represented by a push pin, the user can select the push pin and information included in the address book is retrieved and provided to the user. For example, in one implementation where the mobile device 100 includes a touch sensitive display (e.g., touch sensitive display 102 shown in FIG. 1), the user can touch a push pin to select the push pin, and the contact information for the item of interest corresponding to the push pin is displayed or otherwise presented to the user (e.g., as an audio and/or video presentation).

In one implementation, a single touch of the push pin, e.g., a tap on the touch sensitive display can yield a first result and a sustained touch of the push pin can yield a second result (examples of first and second results are described below). In another implementation, where a user can interact with the map 600 using a pointing device (e.g., a joystick), hovering a cursor over the push pin can yield the first result and clicking the push pin can yield the second result.

Referring now to FIG. 6B, an example of information that can be provided to the user upon selecting a push pin is shown. In this example, the user selected the push pin 604 and a first result is displayed. The first result is displayed in an information balloon 608 superimposed on the map 600. The information balloon 608 includes contact information (e.g., the name, address and telephone number) of the item represented by the push pin 604. In this example, the user tapped on the touch sensitive display 102 in the vicinity of the push pin 604 to yield this first result, being the contact information for this particular item.

The configuration of the graphical user interface presenting the information balloon 608 can be configured differently and can include different, or more or less information about the item in other implementations.

Another example of selecting a graphical object, such as, a sustained touch of the push pin, can result in an initiation of a telephone call to the contact telephone number presented as the first result. For example, a sustained touch of the push pin 604 can result in a telephone call being initiated to item of interest represented by the push pin 604. In another implementation, driving directions can be provided from the current location of the mobile device 102 to the item of interest. In yet another implementation, an e-mail can be sent to contacts on a buddy list inviting others to meet the user of the mobile device at the item of interest.

Figure 6C:
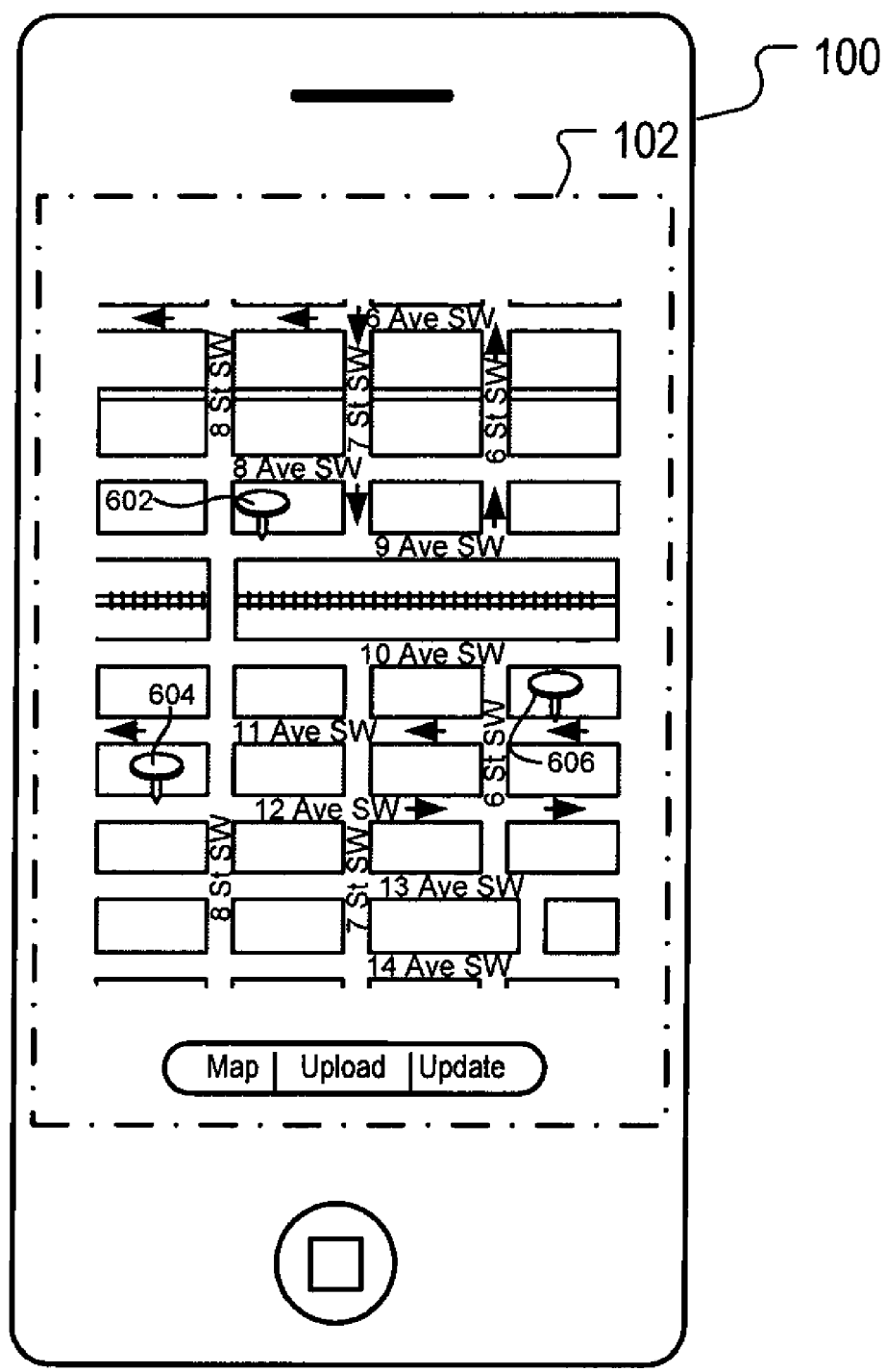
FIG. 6C illustrates an example mobile device presenting a user interface on the touch sensitive display.

FIG. 6C is an example mobile device 100 presenting a user interface on the touch sensitive display 102. The user interface includes the map 600 displaying the graphical objects 602, 604 and 606. An input user interface 610 is provided to present options to a user. In an implementation, a user can choose to share the categorical information (e.g., a data structure represented by the graphical objects 602, 604 and 606) through an interface provided by an information service 280. For example, the data representative of the graphical objects 602, 604 and 606 can be stored in the memory 350 of the mobile device 100 and communicated by the wireless communication subsystem 324 to the information service 280 by selecting an upload option. In another implementation, the information service 280 can maintain a version of the data structure that was communicated to the mobile device 100 for access by others. In another implementation, a second mobile device can establish a peer-to-peer connection with the mobile device 100 to receive the data representative of the graphical objects 602, 604 and 606.

In an implementation, the data at the information service 280 can be shared with others in accordance with access rights as described above regard to FIG. 5B. Other users can retrieve the data from the information service 280 and display the categorical information as graphical objects using another mobile device, personal computer, set-top box, gaming device, portable video player or portable image viewer.

In an implementation, according to, e.g., a user selection or system setting, data that satisfies the request for categorical information can be manually updated in response to an input. Manual updates can be retrieved from the information service 280 and provided to the mobile device 100 as new or updated information that satisfies the request for categorical information becomes available at the information service 280.

Exemplary Location-Based Information Services Process

Figure 7:
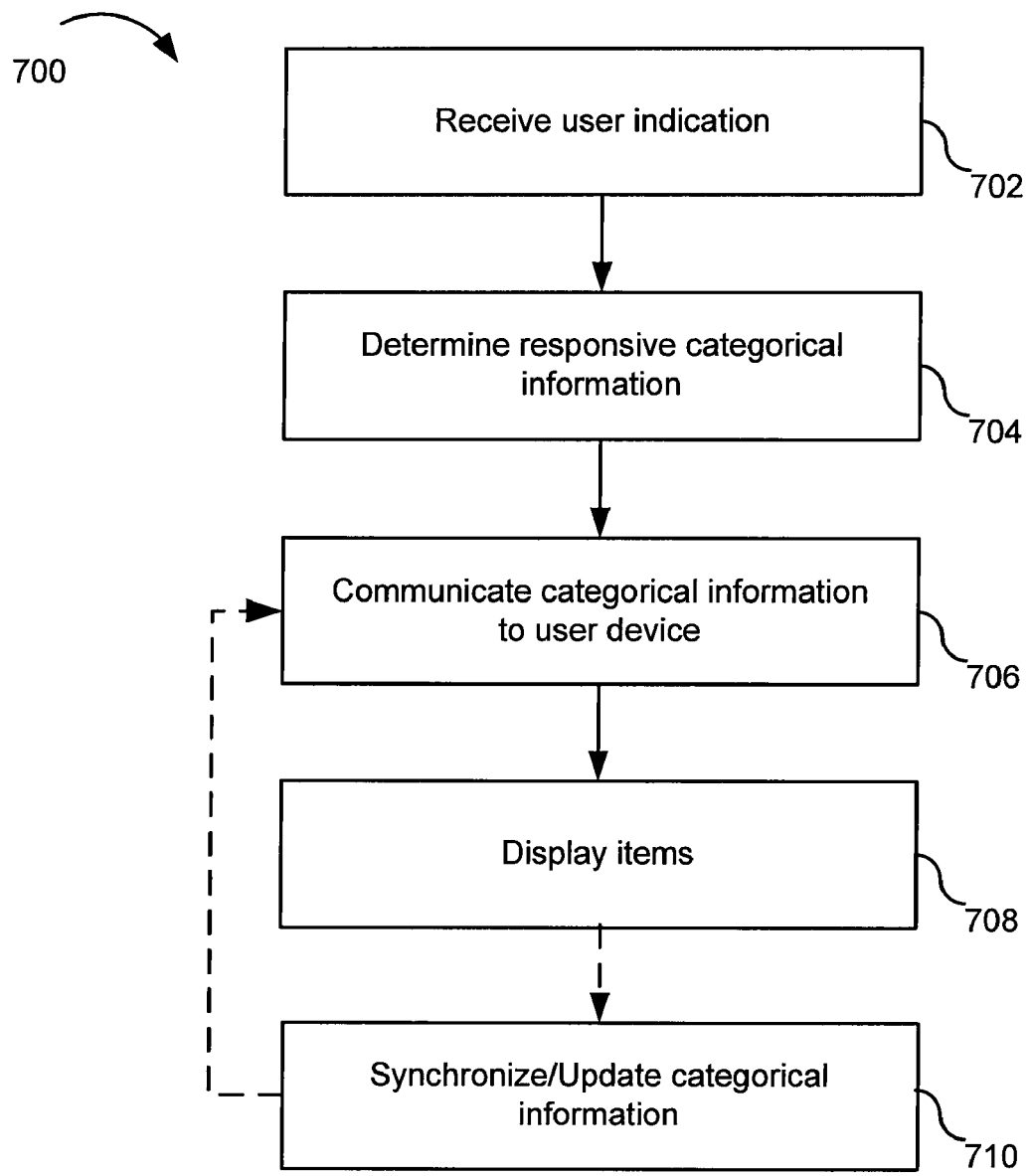
FIG. 7 is a flow diagram of an example process for providing categorical information to the mobile device of FIG. 1.

FIG. 7 is a flow diagram of an example process 700 for providing categorical information to the mobile device 100 of FIG. 1. In an implementation, the example process 700 can be implemented as instructions stored in memory 350 and executed on the processor 304 and/or instructions executed by the information service 280. At stage 702, a user indication is received. For example, a user may input a request for categorical information by using the user interface 500 shown in FIG. 5A that is received by the information service 280.

At stage 704, a responsive collection of categorical information is determined. For example, in response to the request made by a user, the information service 280 can assemble categorical data responsive to the categorical topic selected by the user in the interface 500 shown in FIG. 5A using a system such as shown in FIG. 4.

At stage 706, categorical information is received. For example, the mobile device 100 can receive categorical information in a data structure from the information service 280 using the wireless communication subsystem 324.

At stage 708, the categorical data is displayed. For example, the categorical data is displayed in the touch sensitive display 102, as graphical objects representing items of interest, such as shown in FIGS. 6A and 6B.

Optionally, at stage 710, the categorical data is updated. For example, in response to a user input or a system setting, updates to the categorical information can be communicated to, or synchronized with, the mobile device 102 to update the display shown in the touch sensitive display 102 or the data stored at the information service 280. The updating/synchronization can be automatic or manually initiated by user input.

Figure 8:
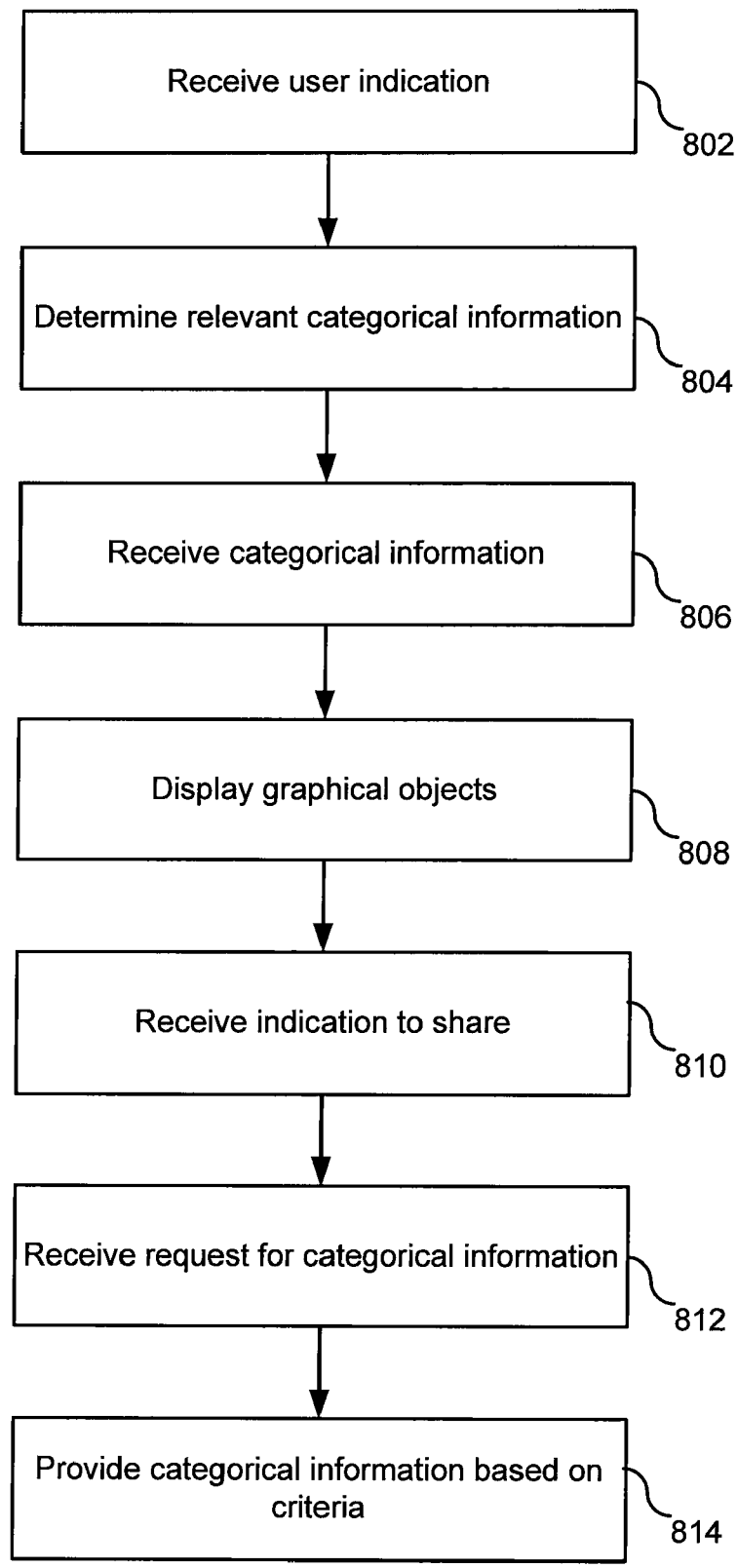
FIG. 8 is a flow diagram of an example process for selecting and sharing categorical information using the mobile device of FIG. 1.

FIG. 8 is a flow diagram of an example process 800 for selected and sharing categorical information. In an implementation, the example process 800 can be implemented as instructions stored in memory 350 and executed on the processor 304 and/or instructions executed by the information service 280. At stage 802, a user indication is received. For example, a user may input a request for categorical information by using the user interface 500 shown in FIG. 5A that is received by the information service 280.

At stage 804, a responsive collection of categorical information is determined. For example, in response to the request made by a user, the information service 280 can assemble categorical data responsive to the categorical topic selected by the user in the interface 500 shown in FIG. 5A using a system such as shown in FIG. 4.

At stage 806, categorical information is received. For example, the mobile device 100 can receive categorical information in a data structure from the information service 280 using the wireless communication subsystem 324.

At stage 808, the categorical data is displayed. For example, the categorical data is displayed in the touch sensitive display 102, as graphical objects representing items of interest, such as shown in FIGS. 6A and 6B.

At stage 810, an indication to share the categorical data is received. For example, using an interface such as FIGS. 5A and 6C, a user of the mobile device 100 can indicate using the touch sensitive display 102 that the collection of categorical data is to be shared with others. The categorical information can be uploaded from the mobile device 100 to an information service 280, or the information service 280 can retain a version of the categorical data that is made accessible to others.

At stage 812, a request is received. For example, the information service 280 can receive a request from a second user for the collection of categorical information specified by the user of the mobile device 100. The second user can be authenticated against the access rights set by the user of the mobile device 100.

At stage 814, the collection of categorical information is provided. For example, the requester of the categorical information can receive the collection created by the user of the mobile device 100 at another mobile device, personal computer, set-top, video player, or image viewer. The collection of categorical data is provided in accordance with the criteria indicated in, for example, FIG. 5B.

The disclosed embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of what is disclosed here, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications may be made to the disclosed implementations and still be within the scope of the following claims.

What is claimed is:

1. A method comprising:
   receiving, from a mobile device, a request for shared categorical information, the request includes a user-specified category, the shared categorical information being requested comprising information on one or more items of interest that are designated as belonging to the category by at least one other mobile device, wherein the categorical information is provided for sharing by the other mobile device;
   receiving, from the mobile device, location information identifying a geographic location of the mobile device;
   determining location-based categorical information using the user-specified category and the location information, the location-based categorical information comprising information on at least one of the one or more items of interest that belong to the user-specified category, wherein the at least one item satisfies a proximity condition in relation to the geographic location; and
   providing the location-based categorical information to the mobile device for representation as a graphical object in a map on a display associated with the mobile device.

2. The method of claim 1, further comprising:
   representing an item of interest in the location-based categorical information on the map as a push pin.

3. The method of claim 1, further comprising:
   providing the location-based categorical information for display in accordance with a zoom level of the map.

4. The method of claim 1, further comprising:
   providing, in response to a selection of the graphical object, additional information regarding the location-based categorical information represented by the graphical object.

5. The method of claim 1, further comprising:
   synchronizing the location-based categorical information on the mobile device with an information service.

6. The method of claim 1, wherein the request specifies access rights to the categorical information.

7. The method of claim 6, further comprising:
   providing the categorical information to a second mobile device according to the access rights.

8. The method of claim 1, wherein the geographic location is determined using global positioning system (GPS) coordinate data.

9. A method comprising:
   receiving, by a first mobile device, a user input requesting shared categorical information, the request includes a user-specified category, the shared categorical information being requested comprising information on one or more items of interest that are designated as belonging to the category by at least one second mobile device, wherein the categorical information is provided for sharing by the second mobile device;
   receiving, by the first mobile device, location information identifying a geographic location of the first mobile device;
   determining, by the first mobile device, location-based categorical information using the user-specified category and the location information, location-based categorical information comprising information on at least one of the one or more items of interest that belong to the user-specified category, wherein the at least one item device satisfies a proximity condition in relation to the geographic location; and
   providing, by the first mobile device, the location-based categorical information for presentation as a marker on a map.

10. The method of claim 9, wherein the marker is a virtual push pin displayed on the map.

11. The method of claim 9, comprising:
    specifying one or more access privileges for the marker; and
    verifying that a user of the first mobile device has the access privileges.

12. The method of claim 9, comprising:
    receiving a selection of the marker, the selection including a touch input; and
    performing an action according to an information item corresponding to the marker.

13. The method of claim 9, comprising determining that the item of interest satisfies the proximity condition, wherein the determining includes determining that the item is located within a threshold distance from the first mobile device.

14. A software product tangibly stored on a non-transitory storage device, the product configured to cause a data processing device to perform operations comprising:
    receiving, by a first mobile device, a user input requesting shared categorical information, the request includes a user-specified category, the shared categorical information being requested comprising information on one or more items of interest that are designated as belonging to the category by at least one second mobile device, wherein the categorical information is provided for sharing by the second mobile device;
    receiving, by the first mobile device, location information identifying a geographic location of the first mobile device;
    determining, by the first mobile device, location-based categorical information using the user-specified category and the location information, the location-based categorical information comprising information on at least one of the one or more items of interest that belong to the user-specified category, wherein the at least one item satisfies a proximity condition in relation to the geographic location; and
    providing, by the first mobile device, the location-based categorical information for presentation as a marker on a map.

15. The product of claim 14, wherein the marker is a virtual push pin displayed on the map.

16. The product of claim 14, the operations comprising:
specifying one or more access privileges for the marker; and
verifying that a user of the first mobile device has the access privileges.

17. The product of claim 14, the operations comprising:
receiving a selection of the marker, the selection including a touch input; and
performing an action according to an information item corresponding to the marker.

18. The product of claim 14, the operations comprising determining that the item of interest satisfies the proximity condition wherein the determining includes determining that the item is located within a threshold distance from the first mobile device.

19. A system, comprising:
one or more data processing devices configured to perform operations comprising:
receiving, by a first mobile device, a user input requesting shared categorical information, the request includes a user-specified category, the shared categorical information being requested comprising information on one or more items of interest that are designated as belonging to the category by at least one second mobile device, wherein the categorical information is provided for sharing by the second mobile device;
receiving, by the first mobile device, location information identifying a geographic location of the first mobile device;
determining, by the first mobile device, location-based categorical information using the user-specified category and the location information, the location-based categorical information comprising information on at least one of the one or more items of interest that belong to the user-specified category, wherein the at least one item satisfies a proximity condition in relation to the geographic location; and
providing, by the first mobile device, the location-based categorical information for presentation as a marker on a map.

20. The system of claim 19, wherein each the marker is a virtual push pin displayed on the map.

21. The system of claim 19, the operations comprising:
specifying one or more access privileges for the marker; and
verifying that a user of the second mobile device has the access privileges.

22. The system of claim 19, the operations comprising:
receiving a selection of the marker, the selection including a touch input; and
performing an action according to an information item corresponding to the marker.

23. The system of claim 19, the operations comprising determining that the item of interest satisfies the proximity condition, wherein the determining includes determining that the item is located within a threshold distance from the first mobile device.

24. A system comprising:
one or more computing devices operable to perform operations comprising:
receiving, from a mobile device, a request for shared categorical information, the request includes a user-specified category, the shared categorical information being requested comprising information on one or more items of interest that are designated as belonging to the category by at least one other mobile device, wherein the categorical information is provided for sharing by the other mobile device;
receiving, from the mobile device, location information identifying a geographic location of the mobile device;
determining location-based categorical information using the user-specified category and the location information, the location-based categorical information comprising information on at least one of the one or more items of interest that belong to the user-specified category, wherein the at least one item satisfies a proximity condition in relation to the geographic location; and
providing the location-based categorical information to the mobile device for representation as a graphical object in a map on a display associated with the mobile device.

25. The system of claim 24, wherein the geographic location is determined using global positioning system (GPS) coordinate data.

26. The system of claim 24, the operations comprising:
representing an item of interest in the location-based categorical information on the map as a push pin.

27. The system of claim 24, the operations comprising:
providing the location-based categorical information for display in accordance with a zoom level of the map.

28. The system of claim 24, the operations comprising:
providing, in response to a selection of the graphical object, additional information regarding the location-based categorical information represented by the graphical object.

29. The system of claim 24, the operations further comprising:
synchronizing the location-based categorical information on the mobile device with an information service.

30. A non-transitory storage device storing instructions operable to cause one or more computing devices to perform operations comprising:
receiving, from a mobile device, a request for shared categorical information, the request includes a user-specified category, the shared categorical information being requested comprising information on one or more items of interest that are designated as belonging to the category by at least one other mobile device, wherein the categorical information is provided for sharing by the other mobile device;
receiving, from the mobile device, location information identifying a geographic location of the mobile device;
determining location-based categorical information using the user-specified category and the location information, the location-based categorical information comprising information on at least one of the one or more items of interest that belong to the user-specified category, wherein the at least one item satisfies a proximity condition in relation to the geographic location; and
providing the location-based categorical information to the mobile device for representation as a graphical object in a map on a display associated with the mobile device.

31. The device of claim 30, the operations comprising:
representing an item of interest in the location-based categorical information on the map as a push pin.

32. The device of claim 30, the operations comprising:
providing the location-based categorical information for display in accordance with a zoom level of the map.

33. The device of claim 30, the operations comprising:
providing, in response to a selection of the graphical object, additional information regarding the location-based categorical information represented by the graphical object.

34. The device of claim 30, the operations comprising:
synchronizing the location-based categorical information on the mobile device with an information service.

* * * * *